United States Patent
Sasayama et al.

(10) Patent No.: US 6,461,757 B1
(45) Date of Patent: Oct. 8, 2002

(54) NON-AQUEOUS BATTERY OF A THIN CONFIGURATION

(75) Inventors: Masa-aki Sasayama, Fuji; Takashi Minakata, Shizuoka-ken; Kouichi Yasukata, Suzuka, all of (JP)

(73) Assignee: Asahi Kasei Kogyo Kabushiki Kaisha, Osaka (JP)

(*) Notice: Subject to any disclaimer, the term of this patent is extended or adjusted under 35 U.S.C. 154(b) by 0 days.

(21) Appl. No.: 09/380,843

(22) PCT Filed: Mar. 19, 1998

(86) PCT No.: PCT/JP98/01193

§ 371 (c)(1), (2), (4) Date: Sep. 10, 1999

(87) PCT Pub. No.: WO98/42036

PCT Pub. Date: Sep. 24, 1998

(30) Foreign Application Priority Data

Mar. 19, 1997 (JP) .............................. 9-066473
Apr. 14, 1997 (JP) .............................. 9-095882

(51) Int. Cl.$^7$ ................................. H01M 2/06
(52) U.S. Cl. ................ 429/59; 429/127; 429/163; 429/211
(58) Field of Search ................ 429/127, 163, 429/211, 59, 231.95; 29/623.2, 623.3, 623.4

(56) References Cited

U.S. PATENT DOCUMENTS

| | | | |
|---|---|---|---|
| 5,405,715 | * | 4/1995 | Dawson et al. |
| 5,445,856 | * | 8/1995 | Chaloner-Gill |
| 6,042,966 | * | 3/2000 | Chen |
| 6,136,464 | * | 10/2000 | Wakabe et al. |
| 6,187,472 | * | 2/2001 | Shiota et al. |

FOREIGN PATENT DOCUMENTS

| | | | |
|---|---|---|---|
| EP | 0397248 | | 11/1990 |
| GB | 2149197 A | | 6/1985 |
| JP | 56-54568 | | 5/1981 |
| JP | 58-154164 | * | 9/1983 |
| JP | 58-206041 | | 12/1983 |
| JP | 60-49568 | | 3/1985 |
| JP | 60-86754 | | 5/1985 |
| JP | 60-100362 | | 6/1985 |
| JP | 60-195866 | | 10/1985 |
| JP | 1-112652 | | 5/1989 |
| JP | 2-21557 | | 1/1990 |
| JP | 4-58146 | | 9/1992 |
| JP | 5-182649 | | 7/1993 |
| JP | 8-50920 | | 2/1996 |

OTHER PUBLICATIONS

Microfilm of the specification and drawings annexed to the request of Japanese Utility Model Application No. 135265/1985, Mar. 16, 1987.

* cited by examiner

Primary Examiner—Patrick Ryan
Assistant Examiner—Susy Tsang-Foster
(74) Attorney, Agent, or Firm—Birch, Stewart, Kolasch & Birch, LLP

(57) ABSTRACT

A non-aqueous battery is provided in a pouchy casing comprising opposing sheets of at least three-layer laminates, each laminate comprising (1) an inner thermoplastic resin layer, (2) a middle metal foil layer, and (3) an outer electrically insulating material layer, wherein the pouchy casing has an elongated, hermetic adhesion area along a periphery of the pouchy casing, and the middle metal foil layer has a peripheral elongated region in the elongated, hermetic adhesion area of the pouchy casing, and at least a pair of terminals electrically connected to the cathode and anode of the battery extends through and protrudes from the terminal-withdrawal sites in the elongated, hermetic adhesion area toward the outside of the pouchy casing, and the battery has at least one of the following features: (i) the peripheral elongated region of the middle metal foil layer has cut-out portions around the terminal-withdrawal sites and (ii) the surface of the peripheral edge of the pouchy casing is provided with electric insulation at least at portions around the terminal-withdrawal sites.

15 Claims, 4 Drawing Sheets

NON-AQUEOUS BATTERY OF A THIN CONFIGURATION

This application is the national phase 35 U.S.C. §371 of prior PCT International Application No. PCT/JP98/01193 which has an International filing date of Mar. 19, 1998 which designated the United States of America.

BACKGROUND OF THE INVENTION

FIELD OF THE INVENTION

The present invention relates to a novel non-aqueous battery of a thin configuration. More specifically, the present invention is concerned with a non-aqueous battery of a thin configuration, comprising a hermetically sealed pouchy casing enveloping an electrochemical cell, and terminals electrically connected to a cathode and an anode of the electrochemical cell, wherein the pouchy casing comprises opposite sheets of at least-three-layer laminates, each comprising an inner thermoplastic resin layer, a middle metal foil layer and an outer electrically insulating material layer, and the pouchy casing has an elongated, hermetic adhesion area along a periphery of the pouchy casing, in which adhesion area the opposite inner thermoplastic resin layers are melt-adhered to each other, thereby forming a hermetic seal of the pouchy casing, wherein the middle metal foil layer (2) has a peripheral elongated region in said elongated, hermetic adhesion area of the poaching casing, with the terminals extending through and protruding from terminal-withdrawal sites in the elongated, hermetic adhesion area toward the outside of the pouchy casing, and wherein the non-aqueous battery satisfies at least one of the following characteristics (i) and (ii):

(i) the peripheral elongated region of the middle metal foil layer (2) has cut-out portions around the terminal-withdrawal sites in the elongated hermetic adhesion area of the pouchy casing through which the terminals extend wherein each of the cut-out portions in the peripheral elongated region of the middle metal foil layer in the elongated, hermetic adhesion area has a predetermined width-wise depth as viewed and measured in a direction of the width of the peripheral elongated region of the middle metal foil layer from a peripheral edge of a pouchy casing, and wherein portions of the peripheral elongated region of said middle foil layer that are not cut out remain in the elongated hermetic adhesion area and the width of each of the remaining non-cut-out portions of the metal foil layer is at least ten times the thickness of the inner thermoplastic resin layer (1) in the elongated, hermetic adhesion area; and (ii) the surface of the peripheral edge of the pouchy casing comprised of the laminate is provided with electric insulation at least at portions thereof around the terminal-withdrawal sites.

By virtue of the above-mentioned unique structure, the non-aqueous battery of the present invention having a thin configuration is advantageous not only in that it is light in weight, thin and flexible, but also in that it has an excellent moisture resistance and an excellent air tightness and is free from the danger of the occurrence of a short-circuiting at portions around the terminal-withdrawal sites. Therefore, the non-aqueous battery of the present invention can be advantageously used especially as a small, light-weight battery (for example, as a battery for portable equipments) having a high capacity and excellent safety.

PRIOR ART

In accordance with the tendency of reduction in potential of lithium. Conventionally, as casings for such batteries, metallic containers prepared by shaping a metal sheet into the form of a cylinder, a polygon, a coin or the like in accordance with the use of the battery have been used. However, it is difficult to reduce the weight of such a battery having a metallic casing, and also there are limitations with respect to the freedom of designing the shapes of metallic casings.

On the other hand, as compared to the above battery having a metallic casing, not only does a battery having a casing prepared from a laminate comprised mainly of a metal foil and a resin film become light in weight and flexible, but also the thickness of the battery can be easily reduced. In addition, with respect to such a battery having a casing made of a laminate comprised mainly of a metallic foil and a resin film, the sealing of the battery can be performed with ease during the production thereof. As examples of such batteries having laminate type casings, Unexamined Japanese Patent Application Laid-Open Specification Nos. 60-100362 and 1-112652 disclose non-aqueous primary batteries having laminate type casings, and Unexamined Japanese Patent Application Laid-Open Specification No. 60-49568 and British Patent Application Publication No. 2149197 disclose solid electrolyte batteries having laminate type casings. Each of the batteries disclosed in these prior art documents has a casing made of either a two-layer laminate comprised of a metal foil layer and a thermoplastic resin layer or a three-layer laminate comprised of an electrically insulating material layer, a metal foil layer and a thermoplastic resin layer. In such batteries, an electrochemical cell having terminals made of a SUS film or the like is enveloped by a pouchy casing prepared by a method in which the above-mentioned laminate is folded so as for the thermoplastic resin layers to be opposite to each other as inner layers, and the opposite inner thermoplastic resin layers are melt-adhered to each other along a periphery of the opposite inner thermoplastic resin layers to form a hermetic adhesion area, thereby hermetically sealing the pouchy casing, while positioning the terminals so that the terminals of the battery extend through and protrude from the hermetic adhesion area toward the outside of the pouchy casing.

In the conventional battery casings of a laminate type, the metal foil layer of the laminate serves to make the battery impervious to permeation of water vapor, and the electrically insulating material layer has an effect to protect the metal foil layer. The metal foil layer of the laminate used for the battery casing is made of aluminum or the like; the thermoplastic resin layer of the laminate is made of an ionomer, polyethylene, polypropylene or the like; and the electrically insulating material layer is made of polypropylene, polyethylene terephthalate or the like. Conventionally, the use of such a laminate for a battery casing has posed the following problems. A short-circuiting frequently occurs between the metal foil layer and the terminals during the melt-adhesion conducted for sealing the casing in the production of the battery. Further, after the production of the battery, a short-circuiting frequently occurs between the terminals and the metal foil layer exposed in the peripheral edge of the casing. The occurrence of these short-circuitings are serious problems from the viewpoint of reliability and safety during the production and use of the battery.

As a method for preventing the occurrence of a short-circuiting during the melt-adhesion for sealing the casing in the production of the battery, Unexamined Japanese Patent Application Laid-Open Specification No. 60-86754 and Examined Japanese Patent Application Publication No.

4-58146 disclose a method in which an intermediate electrically insulating material layer capable of remaining intact during the melt-adhesion is interposed between the metal foil layer and the thermoplastic resin layer of the laminate. However, batteries produced by this method do not solve the problem that a short-circuiting is likely to occur between the terminals and the metal foil layer exposed in the peripheral edge of the casing. Moreover, this method is also disadvantageous in that, since the intermediate electrically insulating material layer employed in this method is intact during the melt-adhesion for sealing the casing, a good adhesion cannot be obtained between the thermoplastic resin layer and the intermediate electrically insulating material layer, which results in a lowering of the air tightness and moisture resistance of the battery. Further, in this method, the production process becomes complicated.

There has been known a battery having a hermetically sealed pouchy casing made of a laminate of an inner thermoplastic structural adhesive layer, a middle metal foil layer and an outer high heat resistant polyester layer, in which the hermetic adhesion area is free of the metal foil layer, and the terminals extend through the elongated hermetic adhesion area (see Unexamined Japanese Patent Application Laid-Open Specification No. 3-62447 corresponding to European Patent Application Publication No. 397 248). In this battery, the casing has a portion along the inner side of the hermetic adhesion area, which portion has neither the hermetic adhesion area nor the metal foil layer. Therefore, when such battery is used, for example, as a secondary battery which is required to be capable of stable operation for a long period of time, problems arise that the battery suffers an intrusion of substances (such as water vapor) which impair battery performance, and also suffers a leaking-out of the solvent molecules of the electrolytic liquid.

Further, Unexamined Japanese Patent Application Laid-Open Specification No. 60-49568 discloses a method in which a battery is covered with a thermosetting resin, followed by a heat-curing of the thermosetting resin. This method is effective for preventing a short-circuiting between the metal foil layer and the terminals, but the elevated temperature necessary for curing the thermosetting resin is likely to adversely affect the electrochemical cell of the battery.

SUMMARY OF THE INVENTION

In this situation, the present inventors have made extensive and intensive studies with a view toward solving the above difficult problems accompanying the prior art, that is, toward developing a non-aqueous battery of a thin configuration, which comprises a non-aqueous electrochemical cell enveloped by a pouchy casing made by melt-adhering opposite sheets of laminates and which has advantages not only in that a short-circuiting between a metal foil layer and terminals can be surely prevented, but also in that the battery can be easily produced and exhibits an excellent air tightness and an excellent moisture resistance. As a result, it has unexpectedly been found that the above objective can be attained by a non-aqueous battery which employs a pouchy casing made of opposites sheets of at least-three-layer laminates, each comprising an inner thermoplastic resin layer, a middle metal foil layer and an outer electrically insulating material layer, wherein the pouchy casing has an elongated, hermetic adhesion area along a periphery of the pouchy casing in which adhesion area the opposite inner thermoplastic resin layers are melt-adhered to each other and the pouchy casing has terminal-withdrawal sites in the elongated, hermetic adhesion area, and wherein the pouchy casing satisfies at least one of the following characteristics (i) and (ii):

(i) the peripheral elongated region of the middle metal foil layer (2) has cut-out portions around the terminal-withdrawal sites in the elongated hermetic adhesion area of the pouchy casing through which the terminals extend wherein each of the cut-out portions in the peripheral elongated region of the middle metal foil layer in the elongated, hermetic adhesion area has a predetermined width-wise depth as viewed and measured in a direction of the width of the peripheral elongated region of the middle metal foil layer from a peripheral edge of a pouchy casing, and wherein portions of the peripheral elongated region of the middle metal foil layer that are not cut out remain in the elongated hermetic adhesion area and the width of each of the remaining non-cut-out portions of the metal foil layer is at least ten times the thickness of the inner thermoplastic resin layer (1) in the elongated, hermetic adhesion area; and (ii) the surface of the peripheral edge of the pouchy casing comprised of the laminate is provided with electric insulation at least at portions thereof around the terminal-withdrawal sites.

That is, it has been found that, by the use of the above pouchy casing in a non-aqueous battery, not only can the occurrence of a short-circuiting be very greatly suppressed, but also the electrochemical cell can be easily sealed inside the casing while achieving an excellent air tightness and an excellent moisture resistance. The present invention has been made, based on this novel finding.

Therefore, a primary object of the present invention is to provide a non-aqueous battery of a lightweight and a thin configuration, which is free from the danger of the occurrence of a short-circuiting and exhibits an excellent air tightness, a high reliability and a high safety.

The foregoing and other objects, features and advantages of the present invention will be apparent from the following detailed description taken in connection with the accompanying drawings and the appended claims.

BRIEF DESCRIPTION OF THE DRAWINGS

In the drawings:

FIG. 1 shows schematic views explaining the non-aqueous battery of a thin configuration prepared in Example 1, wherein FIG. 1(a) is a plan view of a laminate (used for preparing a pouchy casing) in which a middle metal foil layer is partly cut-out at several portions in one side thereof; FIG. 1(b) is a cross-sectional view taken along line Ib—Ib of FIG. 1(a); and FIG. 1(c) is a plan view of the non-aqueous battery of a thin configuration;

FIG. 2 shows schematic views explaining the non-aqueous battery of a thin configuration prepared in Example 2, wherein FIG. 2(a) is a plan view of a laminate (used for preparing a pouchy casing) in which a middle metal foil layer is cut-out along the entire length of one side thereof; FIG. 2(b) is a cross-sectional view taken along line IIb—IIb of FIG. 2(a); and FIG. 2(c) is a plan view of the non-aqueous battery of a thin configuration;

FIG. 3 shows schematic views explaining the non-aqueous battery of a thin configuration prepared in Example 3, wherein FIG. 3(a) is a plan view of a laminate (used for preparing a pouchy casing) in which the entire periphery of a middle metal foil layer is cut-out, wherein the entire periphery includes both the side having portions corresponding to terminal-withdrawal sites and the side opposite thereto; FIG. 3(b) is a cross-sectional view taken along line IIIb—IIIb of FIG. 3(a); and FIG. 3(c) is a plan view of the non-aqueous battery of a thin configuration; and FIG. 4 shows schematic views explaining the non-aqueous battery prepared in Example 6, wherein FIG. 4(a) is a partly-cut-away plan view of the non-aqueous battery (terminals 9, 9 are shown by imaginary lines), in which the surface of the peripheral edge of the casing is provided with electric insulation at portions thereof around the terminal-withdrawal sites; and FIG. 4(b) is a cross-sectional view taken along line IVb—IVb of FIG. 4(a).

DESCRIPTION OF REFERENCE NUMERALS

Figure 1:
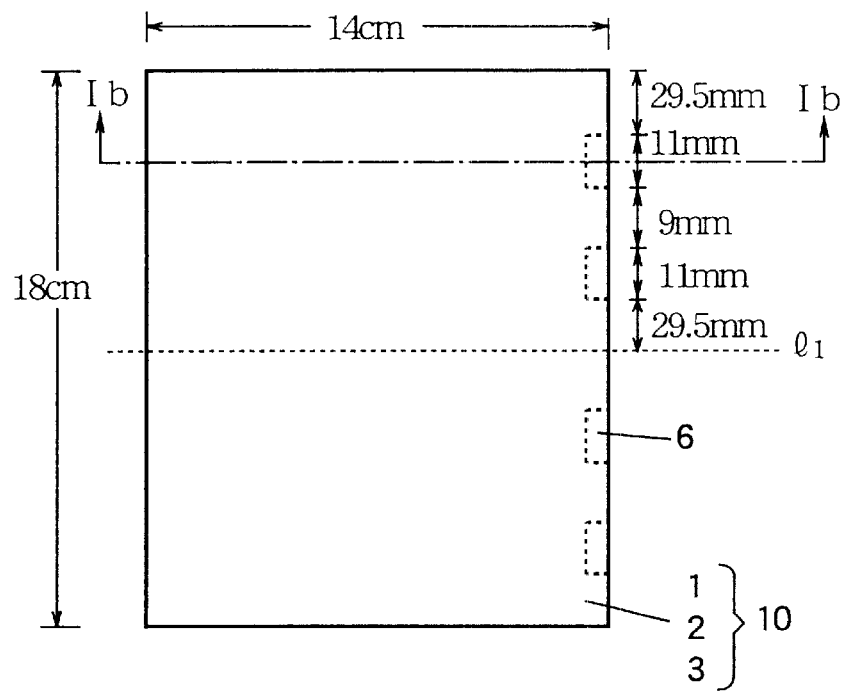
Figure 1:
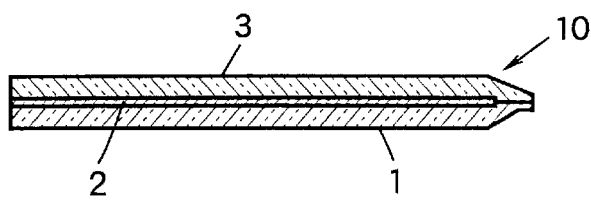
Figure 1:
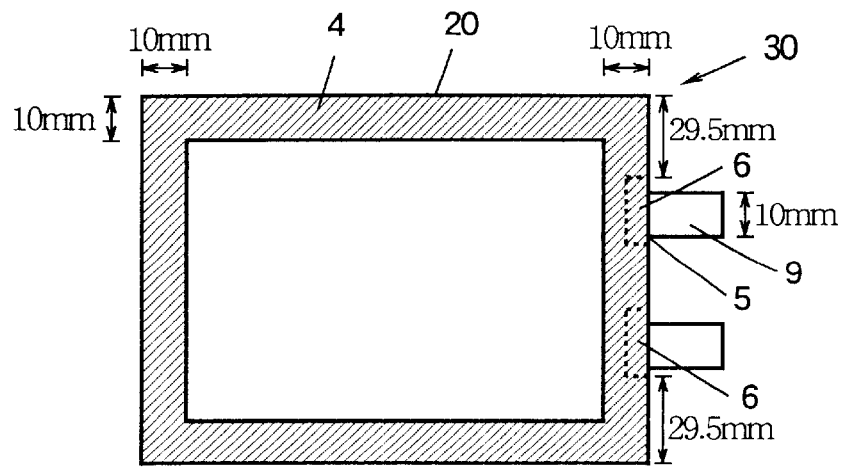

1: Inner thermoplastic resin layer
2: Middle metal foil layer
3: Outer electrically insulating material layer
4: Elongated, hermetic adhesion area
5: Terminal-withdrawal site
6: Cut-out portion of a middle metal foil layer
7: Electrically insulating material
9: Terminal
10: Laminate
20: Casing
30: Non-aqueous battery of a thin configuration
]1, ]2, ]3: Line about which a laminate is folded in two for producing a casing

DESCRIPTION OF THE INVENTION

According to the present invention, there is provided a non-aqueous battery of a thin configuration, comprising:

(a) an electrochemical cell comprising a cathode, an anode and a non-aqueous electrolyte interposed between the cathode and the anode, (b) a hermetically sealed pouchy casing enveloping the electrochemical cell (a), and (c) at least a pair of terminals electrically connected to the cathode and the anode, the pouchy casing comprising opposite sheets of at least-three-layer laminates, each comprising (1) an inner thermoplastic resin layer, (2) a middle metal foil layer and (3) an outer electrically insulating material layer, wherein the pouchy casing has an elongated, hermetic adhesion area along a periphery of the pouchy casing, in which adhesion area the opposite inner thermoplastic resin layers (1) are melt-adhered to each other, thereby forming a hermetic seal of the pouchy casing, the terminals extending through and protruding from terminal-withdrawal sites in the elongated, hermetic adhesion area toward the outside of the pouchy casing, wherein the non-aqueous battery satisfies at least one of the following characteristics (i) and (ii):

(i) the peripheral elongated region of the middle metal foil layer (2) has cut-out portions around the terminal-withdrawal sites in the elongated hermetic adhesion area of the pouchy casing through which the terminals extend, wherein each of the cut-out portions in the peripheral elongated region of the middle metal foil layer in the elongated, hermetic adhesion area has a predetermined width-wise depth as viewed and measured in a direction of the width of the peripheral elongated region of the middle metal foil layer from a peripheral edge of a pouchy casing, and wherein portions of the peripheral elongated region of the middle metal foil layer that are not cut-out remain in the elongated hermetic adhesion area and the width of each of the remaining non-cut-out portions of the metal foil layer is at least ten times the thickness of the inner thermoplastic resin layer (1) in the elongated, hermetic adhesion area; and (ii) the surface of the peripheral edge of the pouchy casing comprised of the laminate is provided with electric insulation at least at portions thereof around the terminal-withdrawal sites.

For an easy understanding of the present invention, the essential features and various preferred embodiments of the present invention are enumerated below.

1. A non-aqueous battery of a thin configuration, comprising:

(a) an electrochemical cell comprising a cathode, an anode and a non-aqueous electrolyte interposed between the cathode and the anode, (b) a hermetically sealed pouchy casing enveloping the electrochemical cell (a), and (c) at least a pair of terminals electrically connected to the cathode and the anode, the pouchy casing comprising opposite sheets of at least-three-layer laminates, each comprising (1) an inner thermoplastic resin layer, (2) a middle metal foil layer and (3) an outer electrically insulating material layer, wherein the pouchy casing has an elongated, hermetic adhesion area along a periphery of the pouchy casing, in which adhesion area the opposite inner thermoplastic resin layers (1) are melt-adhered to each other, thereby forming a hermetic seal of the pouchy casing, wherein the middle metal foil layer (2) has a peripheral elongated region in the elongated, hermetic adhesion area of the pouchy casing, with the terminals extending through and protruding from terminal-withdrawal sites in the elongated, hermetic adhesion area toward the outside of the pouchy casing, wherein the non-aqueous battery satisfies at least one of the following characteristics (i) and (ii):

(i) the peripheral elongated region of the middle metal foil layer (2) has cut-out portions around the terminal-withdrawal sites in the elongated hermetic adhesion area of the pouchy casing through which the terminals extend wherein each of the cut-out portions in the peripheral elongated region of the middle metal foil layer in the elongated, hermetic adhesion area has a predetermined width-wise depth as viewed and measured in a direction of the width of the peripheral elongated region of the middle metal foil layer from a peripheral edge of a pouchy casing, and wherein portions of the peripheral elongated region of the middle metal foil layer that are not cut-out remain in the elongated hermetic adhesion area and the width of each of the remaining non-cut-out portions of the metal foil layer is at least ten times the thickness of the inner thermoplastic resin layer (1) in the elongated, hermetic adhesion area; and (ii) the surface of the peripheral edge of the pouchy casing comprised of the laminate is provided with electric insulation at least at portions thereof around the terminal-withdrawal sites.

2. The battery according to item 1 above, wherein the width of the elongated, hermetic adhesion area is within the range of from 1 to 50 mm.

3. The battery according to item 1 or 2 above, wherein the depth of each of the cut-out portions of the middle metal foil layer is 0.1 mm or more and is not more than 80% of the width of the elongated, hermetic adhesion area.

4. The battery according to item 3 above, wherein the depth of each of the cut-out portions of the middle metal foil layer is 0.5 mm or more and is not more than 50% of the width of the elongated, hermetic adhesion area.

5. The battery according to any one of items 1 to 4 above, wherein the width of the cut-out portion of the middle metal foil layer is not less than a half of the circumference of the cross-section of a portion of the terminal which is positioned at the terminal-withdrawal site.

6. The battery according to any one of items 1 to 5 above, wherein the melting temperature of the outer electrically insulating material layer (3) is 260° C. or more.

7. The battery according to any one of items 1 to 6 above, wherein the outer electrically insulating material layer (3) has at least one modulus value selected from the group consisting of a tension modulus of 300 kg/mm$^2$ or more and a compression modulus of 50 kg/mm$^2$ or more.

8. The battery according to any one of items 1 to 7 above, wherein the laminate further comprises at least one intermediate electrically insulating material layer between the inner thermoplastic resin layer (1) and the middle metal foil layer (2).

9. The battery according to item 8 above, wherein the melting temperature of the intermediate electrically insulating material layer disposed between the inner thermoplastic resin layer (1) and the middle metal foil layer (2) is 260° C. or more.

10. The battery according to item 8 or 9 above, wherein the intermediate electrically insulating material layer disposed between the inner thermoplastic resin layer (1) and the middle metal foil layer (2) has at least one modulus value selected from the group consisting of a tension modulus of 300 kg/mm$^2$ or more and a compression modulus of 50 kg/mm$^2$ or more.

11. The battery according to any one of items 1 to 10 above, wherein at least one layer selected from the group consisting of the thermoplastic resin layer and the electrically insulating material layer is made of a polyvinylidene chloride resin.

12. The battery according to any one of items 1 to 11 above, wherein the terminal is made of aluminum or copper.

13. The battery according to item 12 above, wherein at least a part of the surface of the terminal is roughened.

14. The battery according to any one of items 1 to 13 above, which further comprises means adapted to be actuated to cut at least a part of the terminal when the pouchy casing. suffers expansion and distortion.

15. The battery according to any one of items 1 to 14 above, wherein the battery is a secondary lithium ion battery.

As mentioned above, the non-aqueous battery of the present invention having a thin configuration is a battery comprising (a) an electrochemical cell comprising a cathode, an anode and a non-aqueous electrolyte interposed between the cathode and the anode, (b) a hermetically sealed pouchy casing enveloping the electrochemical cell (a), and (c) at least a pair of terminals electrically connected to the cathode and the anode. The pouchy casing comprises opposite sheets of at least-three-layer laminates, each comprising (1) an inner thermoplastic resin layer, (2) a middle metal foil layer and (3) an outer electrically insulating material layer. The pouchy casing has an elongated, hermetic adhesion area along a periphery of the pouchy casing, in which adhesion area the opposite inner thermoplastic resin layers (1) are melt-adhered to each other, thereby forming a hermetic seal of the pouchy casing wherein the middle metal foil layer (2) has a peripheral elongated region in the elongated, hermetic adhesion area of the pouchy casing. The terminals extend through and protrude from terminal-withdrawal sites in the elongated, hermetic adhesion area toward the outside of the pouchy casing. Further, the non-aqueous battery of the present invention having a thin configuration satisfies at least one of the following characteristics (i) and (ii):

(i) the peripheral elongated region of the middle metal foil layer (2) has cut-out portions around the terminal-withdrawal sites in the elongated hermetic adhesion area of the pouchy casing through which the terminals extend wherein each of the cut-out portions in the peripheral elongated region of the middle metal foil layer in the elongated, hermetic adhesion area has a predetermined width-wise depth as viewed and measured in a direction of the width of the peripheral elongated region of the middle foil layer from a peripheral edge of a pouchy casing, and wherein portions of the peripheral elongated region of the middle metal foil layer that are not cut-out remain in the elongated hermetic adhesion area and the width of each of the remaining non-cut-out portions of the metal foil layer is at least ten times the thickness of the inner thermoplastic resin layer (1) in the elongated, hermetic adhesion area; and (ii) the surface of the peripheral edge of the pouchy casing comprised of the laminate is provided with electric insulation at least at portions thereof around the terminal-withdrawal sites.

As mentioned above, the pouchy casing (b) used in the present invention comprises opposite sheets of at least-three-layer laminates, each comprising (1) an inner thermoplastic resin layer, (2) a middle metal foil layer and (3) an outer electrically insulating material layer.

In the elongated, hermetic adhesion area of the pouchy casing, the opposite inner thermoplastic resin layers (1) (which constitute the inside surfaces of the casing) are melt-adhered to each other along a periphery of the casing, thereby forming a hermetic seal of the pouchy casing so as to seal up the electrochemical cell therein. Thus, the pouchy casing isolates the electrochemical cell from the outside, thereby making the battery impervious not only to a contamination with foreign matters (such as water vapor), but also to a leaking-out of the electrolytic liquid used in the electrochemical cell. Therefore, the thermoplastic resin used for the inner thermoplastic resin layer (1) is preferably one which is neither soluble in nor swellable with the electrolytic liquid used in the electrochemical cell. Examples of such thermoplastic resins include polyethylene, polypropylene, polystyrene, polyvinyl alcohol, an ethylene-vinyl alcohol copolymer, polyvinyl chloride, polyamide, polyester, a polyester copolymer, polyvinylidene chloride, polycarbonate, polyphenylene oxide, formalized polyvinyl alcohol, acrylic acid-modified polyethylene and acrylic acid-modified polypropylene. Further, for improving the adhesion between the opposite inner thermoplastic resin layers, and for improving the adhesion of the inner thermoplastic resin layers to the terminals, an oxidation treatment or a coating may be performed with respect to the surface of the inner thermoplastic resin layer (1). It is preferred that the thickness of the inner thermoplastic resin layer (1) is selected, taking into consideration the balance between the desired strength of layer (1) during the melt-adhesion and the desired weight reduction of the battery. Specifically, the thickness of the inner thermoplastic resin layer (1) is preferably in the range of from 10 to 100 $\mu$m, more preferably from 20 to 90 $\mu$m, and most preferably from 30 to 80 $\mu$m.

It is preferred that the metal foil layer (2) of the pouchy casing serves to make the battery impervious not only to an intrusion of air, oxygen, nitrogen, water and other contaminants which may be present around the battery, but also to a leaking-out of the electrolytic liquid, so that a lowering of the battery performance can be suppressed. Examples of metals used for the middle metal foil layer (2) include aluminum, an aluminum alloy, a SUS, nickel and copper. From the viewpoint of achieving an excellent corrosion resistance, aluminum, an aluminum alloy and a SUS are preferred. Aluminum and an aluminum alloy, which are light in weight and easily processable, are more preferred. The surface of the middle metal foil layer (2) may be roughened so as to increase a strength of adhesion of the metal foil layer to other layers of the laminate.

It is preferred that the thickness of the middle metal foil layer (2) is selected, taking into consideration the balance between the desired moisture resistance, the desired weight reduction and the desired processability. Specifically, the thickness of the middle metal foil layer (2) is preferably in the range of from 3 to 80 $\mu$m, more preferably from 5 to 50 $\mu$m, most preferably from 7 to 30 $\mu$m.

The outer electrically insulating material layer (3), which constitutes the outer surface of the pouchy casing, protects the middle metal foil layer (2) from an impact, a piercing and chemicals, which are likely to be experienced by the outer surface of the casing. The outer electrically insulating material layer (3) also serves to electrically insulate the middle metal foil layer (2) from other metallic materials, such as terminals, thereby preventing an inadvertent short-circuiting. It is necessary that the material used for the outer electrically insulating material layer (3) have a melting temperature higher than that of the inner thermoplastic resin layer (1) of the laminate so that the outer electrically insulating material layer (3) can remain intact during the melt-adhesion. Examples of resins which can be used for the outer electrically insulating material layer (3) include a polyamide resin, a polyester resin, polyvinylidene chloride, polycarbonate, polyphenylene oxide, a glass fiber-containing nylon, cellophane, polyvinyl alcohol, polyimide, polyether imide, aromatic polyamide, polyphenylene sulfide, polyether sulfone, poly-para-xylene, polyetheretherketone, syndiotactic polystyrene, a liquid crystal polymer, a fluororesin and a phenolic resin. If desired, a thermoplastic resin or a thermosetting resin having a melting temperature higher than that of the inner thermoplastic resin layer (1) of the laminate can be used in combination with above-mentioned resins.

It is preferred that the thickness of the outer electrically insulating material layer (3) is selected, taking into consideration the balance between the desired mechanical strength and the desired weight reduction. Specifically, the thickness of the outer electrically insulating material layer (3) is preferably in the range of from 1 to 100 $\mu$m, more preferably from 2 to 80 $\mu$m, most preferably from 4 to 50 $\mu$m.

As examples of methods for preparing the laminate, there can be mentioned wet lamination, extrusion coating, coextrusion lamination, dry lamination, hot-melt lamination, heat lamination and the like. Specific examples of processes for realizing the above-mentioned lamination methods include a process in which layers are laminated and subjected to melt-adhesion by heat lamination; a process in which a film of a material having a low melting temperature, such as polyethylene, polypropylene or the like, is interposed between layers; a process in which an adhesive, such as a moisture-curing type urethane polyether, a moisture-curing type urethane polyester, urethane polyether, urethane polyester, polyester polyol, polyisocyanate, or a hot-melt adhesive is interposed between layers; a process in which a molten polymer is casted or extruded on a substrate to form a film; and a process in which a polymer solution or a polymer precursor in a liquid state is casted on a substrate to form a film. The method for producing the laminate can be selected in accordance with the materials for the layers to be laminated. It is preferred that the laminate used for producing the pouchy casing is prepared, taking into consideration the moisture barrier property necessary for a battery casing, the adhesion of the laminate to the terminals, and the method used for sealing the pouchy casing.

As examples of methods for forming the hermetic adhesion area of the pouchy casing, there can be mentioned an impulse sealing; a sealing method using frictional heat, such as spin welding; a sealing method using external heating, such as heat sealing, a laser sealing, an infrared radiation sealing and a hot jet sealing; and a sealing method using internal heating, such as radiofrequency sealing and ultrasonic sealing. In the elongated, hermetic adhesion area of the pouchy casing, the opposite inner thermoplastic resin layers (1) (which constitute the inner surfaces of the casing) are melt-adhered to each other along a periphery of the pouchy casing so as to seal up the electrochemical cell inside the casing.

For increasing the adhesion strength in the battery of the present invention, hot-melt adhesives, such as a polyvinyl alcohol adhesive, an olefin adhesive, a rubber adhesive and a polyamide adhesive may be interposed between the inner thermoplastic resin layer (1) and the terminals, or between the opposite sheets of the inner thermoplastic resin layers (1). It is preferred that the width of the elongated, hermetic adhesion area is selected, taking into consideration the balance between the desired reliability of the hermetic seal and the desired volume energy density of the battery. Specifically, for exhibiting the excellent effects of the present invention, the width of the hermetic adhesion area is preferably in the range of from 1 to 50 mm, more preferably from 2 to 30 mm, most preferably from 2 to 20 mm, as measured from the peripheral edge of the casing.

The projection area of the battery may be reduced by folding the hermetic adhesion area so as to turn the peripheral edge of the casing toward the middle portion of the battery. In this case, the width of the hermetic adhesion area is defined as a value as measured before the folding.

The non-aqueous battery of the present invention having a thin configuration is provided with means for preventing a short-circuiting between the terminals (which extend through and protrude from the terminal-withdrawal sites of the pouchy casing) and a peripheral edge of the middle metal foil layer.

Specifically, such a short-circuiting can be effectively prevented by satisfying at least one of the following characteristics (i) and (ii):

(i) the peripheral elongated region of the middle metal foil layer (2) has cut-out portions around the terminal-withdrawal sites in the elongated hermetic adhesion area of the pouchy casing, through which the terminals extend, wherein each of the cut-out portions in the peripheral elongated region of said middle metal foil layer in the elongated, hermetic adhesion area has a predetermined width-wise depth as viewed and measured in a direction of the width of the peripheral elongated region of the middle foil layer from a peripheral edge of a pouchy casing, and wherein portions of the peripheral elongated region of the middle metal foil layer that are not cut-out remain in the elongated hermetic adhesion area and the width of each of the remaining non-cut-out portions of the metal foil layer is at least ten times the thickness of the inner thermoplastic resin layer (1) in the elongated, hermetic adhesion area; and (ii) the surface of the peripheral edge of the pouchy casing comprised of the laminate is provided with electric insulation at least at portions thereof around the terminal-withdrawal sites.

As mentioned above, in characteristic (i) defined in the present invention, the width of the middle metal foil layer in the elongated, hermetic adhesion area is at least ten times the thickness of the inner thermoplastic resin layer in the elongated, hermetic adhesion area. The reason for this is as follows. In general, the moisture permeability of a metal foil is less than 1/10 of that of a resin film. When the width of the middle metal foil layer in the elongated, hermetic adhesion area is ten times or more the thickness of the inner thermoplastic resin layer in the elongated, hermetic adhesion area, the moisture permeability through the peripheral edge surface of the middle metal foil layer in the widthwise direction of the middle metal foil layer becomes far smaller than the moisture permeability of the pouchy casing in the thicknesswise direction, so that the moisture permeability through the peripheral edge surface of the pouchy casing becomes as small as negligible, as compared to the moisture permeability of the pouchy casing in the thicknesswise direction.

For preventing a short-circuiting between the terminals and the peripheral edge of the middle metal foil layer (2), the width of the middle metal foil layer (2) in the elongated, hermetic adhesion area must be less than the width of the elongated, hermetic adhesion area at least at portions of layer (2) around the terminal-withdrawal sites. Therefore, the width of the middle metal foil layer (2) in the elongated, hermetic adhesion area is preferably at least ten times, more preferably at least 20 times, most preferably at least 40 times the thickness of the inner thermoplastic resin layer in the elongated, hermetic adhesion area, with the proviso that the above-mentioned width is less than the width of the elongated, hermetic adhesion area.

At least at portions around the terminal-withdrawal sites, the elongated portion of the middle metal foil layer (2) in the hermetic adhesion area is cut-out in a peripheral portion thereof by a predetermined width-wise depth which is sufficient to maintain a good insulation between the terminals and the peripheral edge of the middle metal foil layer. It is preferred that the depth of the cut-out portion of the middle metal foil layer is 0.1 mm or more and is not more than 80% of the width of the elongated, hermetic adhesion area. The reason why the preferred value of the width-wise depth of the cut-out portion of the metal foil layer (2) is 0.1 mm or more is as follows. In general, the total thickness of the inner thermoplastic resin layer (1) and the outer electrically insulating material layer (3) is approximately 0.1 mm. Therefore, for surely covering the peripheral edge of the middle metal foil layer (2) by the peripheral areas of the layers (1) and (3) in the peripheral edge of the pouchy casing, it is desired that a portion between the peripheral areas of the layers (1) and (3) is free of the middle metal foil layer (2) over 0.1 mm or more as measured from the peripheral edges of the layers (1) and (3). The reason why the preferred value of the depth of the cut-out portion of the middle metal foil layer (2) is not more than 80% of the width of the elongated, hermetic adhesion area is because, for obtaining a satisfactory level of moisture resistance, the depth of the cut-out portion of the layer (2) need not be more than 80% of the width of the elongated, hermetic adhesion area. Therefore, from the viewpoint of exhibiting the excellent effects of the present invention, i.e., the effects that not only can a short-circuiting between the terminals and the middle metal foil layer be prevented, but also a good moisture resistance can be obtained, it is preferred that the depth of the cut-out portion of the middle metal foil layer is 0.1 mm or more (more advantageously 0.3 mm or more, most advantageously 0.5 mm or more) and is not more than 80% (more advantageously not more than 70%, most advantageously not more than 50%) of the width of the elongated, hermetic adhesion area.

It is preferred that the width of the cut-out portion of the middle metal foil layer (2) is not less than a half of the circumference of the cross-section of a portion of the terminal which is positioned at the terminal-withdrawal site (i.e., preferably not less than the total of the thickness and the width of the terminal when the terminal is a rectangular strip). It is more preferred that the width of the cut-out portion of the middle metal foil layer (2) is not less than 1.5 times a half of the circumference of the cross-section of a portion of the terminal which is positioned at the terminal-withdrawal site. It is most preferred that the width of the cut-out portion of the middle metal foil layer (2) is the same as the length of the side of the casing which side has the terminal withdrawal sites. The reason why the preferred value of the width of the cut-out portion of the middle metal foil layer (2) is not less than a half of the circumference of the cross-section of a portion of the terminal which is positioned at the terminal withdrawal site (i.e., not less than the total of the thickness and the width of the terminal when the terminal is a rectangular strip) is because this preferred value of the cut-out portion is effective for surely preventing a terminal from contacting the middle metal foil layer (2) at the peripheral edge of the pouchy casing even when the terminal is bent.

The depth and width of the cut-out portion of the middle metal foil layer can be easily measured either using a scale graduated in 1 millimeters or under an optical microscope using an objective micrometer graduated in 0.01 millimeters.

Examples of methods for forming the cut-out portion of the middle metal foil layer (2) include a method in which the at least-three-layer laminate is obtained in a state wherein the middle metal foil layer (2) has a cut-out portion, and a method in which an at least-three-layer laminate wherein the middle metal foil layer (2) has no cut-out portion is produced and, then, the middle metal foil layer (2) exposed in the peripheral edge of the laminate is subjected to etching at a portion where a portion should be cut-out, thereby forming a cut-out portion by etching. Examples of methods in which the at least-three-layer laminate is obtained in a state wherein the middle metal foil layer (2) has a cut-out portion include a method in which the layer (2) of the laminate is formed using a metal foil having a size smaller than the size of a resin film used for forming the layer (1) so that the layer (1) is caused to have at least one peripheral portion free of the middle metal foil layer (2), and a method in which the layer (2) of the laminate is formed using a patterning technique. Examples of methods in which the layer (2) of the laminate is formed using a patterning technique include a method in which a mask capable of transmitting a pattern desired for the layer (2) is provided on a resin film used for forming the layer (1) and, then, the middle metal foil layer (2) is formed on the layer (1) by vapor deposition through the mask; a method in which a substrate is patterned using a solvent-soluble substance so as to form a solvent-soluble pattern corresponding to a cut-out portion, and the middle metal foil layer (2) is formed on the substrate having the solvent-soluble pattern thereon, and then, the solvent-soluble pattern is removed by a solvent therefor together with a portion of the layer (2) formed on the pattern; and a method in which the middle metal foil layer (2) is formed on a substrate, and a resist layer having a pattern desired for the layer (2) is formed on the layer (2), and then, the layer (2) is subjected to etching, thereby removing a portion of the layer (2) having no resist layer.

In characteristic (ii) defined in the present invention, the surface of the peripheral edge of the pouchy casing is provided with electric insulation at least at portions thereof around the terminal-withdrawal sites. By this characteristic (ii), the problem that a short-circuiting between a terminal and the middle metal foil layer is likely to occur when the terminal is bent at the peripheral edge of the pouchy casing can be easily prevented.

With respect to the electric insulation treatment in characteristic (ii), it is preferred that the treatment is performed so that the surface resistivity of the treated portion becomes $10^6$ $\Omega/\square$ or more, more advantageously $10^7$ $\Omega/\square$ or more.

It is preferred that the electric insulation treatment is performed so that the electric insulation is achieved not only at the peripheral edge of the casing at the terminal-withdrawal sites of the casing but also at portions contiguously extending around the terminal-withdrawal sites of the casing. It is preferred that the electric insulation treatment in the widthwise direction of the terminal is performed so that the width of the electrically insulated portion exceeds the width of the terminal. It is more preferred that the width of the electrically insulated portion is at least 1.1 times the width of the terminal, most advantageously at least 1.2 times the width of the terminal. Further, it is preferred that the peripheral portions of both the front and back surfaces of the pouchy casing, or the peripheral portions of both the front and back surfaces of each of the opposite sheets of the laminates used for producing the pouchy casing, are treated for electric insulation so as to form an electrically insulated portion contiguously covering the peripheral portions of both surfaces of the pouchy casing over a predetermined depth from the peripheral edge of the pouchy casing around the terminal-withdrawal sites thereof.

Examples of methods for performing the electric insulation treatment include a method in which a tape, a film or a sheet of an insulating material is cut into a predetermined size and adhered to a predetermined portion of the casing by means of an adhesive; a method in which an insulating tape having an adhesive applied onto the back surface thereof is cut into a predetermined size and adhered to a predetermined portion of the casing through the adhesive; a method in which an insulating film capable of melt-adhesion is cut out into a predetermined size and melt-adhered to a predetermined portion of the casing; and a method in which a predetermined portion of the casing is coated with an insulating material. Alternatively, the electric insulation treatment may also be performed by a method in which a predetermined portion of the casing is coated with a solution obtained by dissolving in an appropriate solvent a resin having an insulating property, such as polyethylene.

Examples of insulating materials include inorganic solids, such as glass and mica; semisynthetic polymers, such as pulp and a cellulose derivative; thermoplastic resins, such as polyethylene, polyethylene terephthalate and a fluororesin; and thermosetting resins, such as an epoxy resin, a polyamide resin and a polyimide resin.

Examples of insulating tapes having an adhesive applied onto the back surface thereof include an adhesive-coated polyvinyl chloride tape, an adhesive-coated polyester tape, an adhesive-coated polyamide tape, an adhesive-coated silicone tape, an adhesive-coated polytetrafluoroethylene (trade name: Teflon) tape and an adhesive-coated paper tape.

Examples of insulating films and insulating sheets include a mica paper, a poly(p-phenyleneterephthalamide (trade name: Aramid)/mica paper, poly(p-phenyleneterephthalamide (trade name: Aramid) paper, a polyimide film, a nylon film, a polyethylene terephthalate film, a polytetrafluoroethylene (trade name: Teflon) sheet and a cellophane. As examples of adhesives used for adhering these films or sheets to the pouchy casing, there can be mentioned shellac, a synthetic resin adhesive, such as a phenol resin or an epoxy resin, a phthalic acid resin, a silicone resin, a polyester imide resin and a polyimide resin.

Examples of films capable of melt-adhesion include a polyethylene film, a polypropylene film and a polyethylene terephthalate/polyethylene laminate film. These films can be melt-adhered to the casing.

Examples of coating materials for insulation include a polyimide coating material, a polyurethane coating material and an unsaturated polyester coating material, such as a polyimide varnish, a polyester varnish, a polyester imide varnish and a polyamide imide varnish. With respect to the method for applying a coating material to the casing, there can be mentioned a method in which a coating material is applied to the casing, for example, by a brush or the like, and a method in which a portion of the casing to be coated is immersed into a coating material. After applying the coating material to the casing, the applied coating is subjected to drying at an elevated temperature or room temperature, thereby allowing the solvent contained therein to volatilize.

The electric insulation treatment can be performed either before or after the melt-adhesion of the opposite sheets of the laminates. When it is desired to perform the electric insulation treatment before the melt-adhesion, the operation is conducted as follows. First, the electric insulation treatment by any one of the above-mentioned methods is performed with respect to portions of the opposite sheets of the laminates which portions correspond to the terminal-withdrawal sites of the casing to be prepared. Next, an electrochemical cell (comprising a cathode, an anode and, interposed therebetween, a separator or a solid electrolyte) having terminals is sandwiched between the above-mentioned opposite sheets of the laminates, and the terminals are positioned so that the terminals protrude outwardly from between the opposite sheets at positions corresponding to the portions treated for electric insulation (which portions correspond to the terminal-withdrawal sites of the casing to be prepared). Then, the opposite sheets of the laminates are melt-adhered to each other along a periphery of the opposite sheets, thereby forming a battery of a thin configuration, which comprises a hermetically sealed pouchy casing enveloping the electrochemical cell.

When the electric insulation treatment is performed after the melt-adhesion of the opposite sheets of the laminates, it is preferred that the melt-adhesion is performed so that, at least at the terminal-withdrawal sites and portions around the terminal-withdrawal sites, the outer side of the elongated, hermetic adhesion area is positioned slightly inside of the peripheral edge of the casing so as to leave small non-melt-adhered portions in the peripheral edge of the casing. The reason for this is because, with respect to a casing having such non-melt-adhered portions in the peripheral edge of the casing, the electric insulation treatment can be easily performed, as compared to the electric insulation treatment performed on a casing having no such non-melt-adhered portions in the peripheral edge of the casing.

In addition to the electric insulation treatment of the casing, a boundary between a terminal and the surface of the peripheral edge of the casing may also be treated for electric insulation. By treating the above-mentioned boundary for electric insulation, a direct contact between the terminal and the surface of the peripheral edge of the casing can be more surely prevented, so that the occurrence of a short-circuiting can be more surely prevented between the terminal and a peripheral edge of the middle metal foil layer even when the terminal is bent at the peripheral edge of the casing.

The laminate used for producing the pouchy casing comprises the inner thermoplastic resin layer (1) (which constitutes the inner surface of the casing), the outer electrically insulating material layer (3) (which constitutes the outer surface of the casing), and the middle metal foil layer (2) which is disposed between the layers (1) and (3). It is preferred that the laminate further comprises at least one intermediate electrically insulating material layer between the inner thermoplastic resin layer (1) and the middle metal foil layer (2). It is desired that the optional intermediate electrically insulating material layer disposed between the layers (1) and (2) has a high modulus. The advantage of the intermediate electrically insulating material layer optionally disposed between the inner thermoplastic resin layer (1) and the middle metal foil layer (2) is as follows. When the opposite sheets of the laminates are melt-adhered to each other, it is possible that very small projections or uneven portions in the surfaces of the terminals pierce through the inner thermoplastic resin layer and contact with the middle metal foil layer, thereby causing a short-circuiting between the cathode terminal and the anode terminal through the middle metal foil layer. The intermediate electrically insulating material layer optionally disposed between the inner thermoplastic resin layer (1) and the middle metal foil layer (2) is effective for preventing the occurrence of such a short-circuiting between the cathode and anode terminals through the middle metal foil layer during the melt-adhesion. When a battery having a short-circuiting circuiting is subjected to charging, electric voltage cannot be increased. Further, when a charged battery suffers a short-circuiting due to an impact or the like, a heat generation disadvantageously occurs in the battery.

With respect to the material used for the intermediate electrically insulating material layer (and also for the outer electrically insulating material layer), from the viewpoint of preventing the danger that projections in the surfaces of the terminals pierce through the inner thermoplastic resin layer and damage the inside of the casing, it is desired that the material has a melting temperature of 260° C. or more, and it is also desired that the material has a high tension modulus or a high compression modulus. The tension modulus of any of the intermediate and outer electrically insulating material layers is preferably 300 kg/mm$^2$ or more, more preferably 400 kg/mm$^2$ or more. The compression modulus of any of the intermediate and outer electrically insulating material layers is preferably 50 kg/mm$^2$ or more, more preferably 100 kg/mm$^2$ or more. It is preferred that the intermediate electrically insulating material layer (and also the outer electrically insulating material layer) has at least one modulus value selected from the group consisting of a tension modulus of 300 kg/mm$^2$ or more and a compression modulus of 50 kg/mm$^2$ or more, more advantageously both these tension modulus value and compression modulus value.

Examples of materials used for the intermediate electrically insulating material layer include a polyimide resin film, an aromatic polyamide resin film, a polyester resin film, a glass fiber-containing nylon, cellophane, a biaxially oriented polyvinyl alcohol film and a polyphenylene sulfide film. In addition, use can also be made of a multi-layer laminate film obtained by adhering the above-mentioned insulating materials to other types of electrically insulating materials. An example of a polyimide resin film is Kapton (manufactured and sold by Du Pont-Toray Co., Ltd., Japan), and an example of an aromatic polyamide resin film is Aramica (manufactured and sold by Asahi Kasei Kogyo Kabushiki Kaisha, Japan). Preferred is Aramica since it has a tension modulus of 1,000 kg/mm$^2$ or more and a compression modulus of 100 kg/mm$^2$ or more and hence exhibits an excellent mechanical strength. As a polyester resin film, a polyethylene terephthalate film is preferred since it has a tension modulus of 400 kg/mm$^2$ or more. More preferred is a polyphenylene sulfide film having a tension modulus of 400 kg/mm$^2$.

As mentioned above, it is preferred that the intermediate electrically insulating material layer has a melting temperature of 260° C. or more. An intermediate electrically insulating material layer having a melting temperature in the above-mentioned preferred range provides advantages which are different from those achieved when the outer electrically insulating material layer has a melting temperature in the above-mentioned preferred range. That is, by using an intermediate electrically insulating material layer having a melting temperature in the above-mentioned preferred range, the occurrence of a short-circuiting at a high temperature can be reduced, thereby improving the safety of the battery. Specifically, when a great amount of heat is generated in the terminals or the electrochemical cell due to the application of a great amount of electric current to the terminals, or when the battery is caused to have a high temperature due to an external heating, the intermediate electrically insulating material layer having a melting temperature of 260° C. or more will exhibit an effect to suppress the occurrence of a short-circuiting between the terminals. Consequently, there can be prevented the occurrence of a thermal runaway, i.e., an accident that an uncontrollable temperature elevation of an electrochemical cell results in an explosion and a fire. Therefore, the melting temperature of the intermediate electrically insulating material layer is preferably 260° C. or more, more preferably 265° C. or more, most preferably 270° C. or more. With respect to the outer electrically insulating material layer, the reason why the preferred melting temperature thereof is 260° C. or more is because such an outer electrically insulating material layer having a high melting temperature can maintain the structural integrity of the battery even when the battery is externally heated or when heat is accidentally generated inside the battery.

Examples of electrically insulating materials having a melting temperature of 260° C. or more include plastic materials, such as polyimide, polyetherimide, aromatic polyamide, polyphenylene sulfide, polyether sulfone, poly-para-xylene, polyetheretherketone, syndiotactic polystyrene, a liquid crystal polymer, polyimide, a fluororesin and a phenolic resin; ceramic materials, such as silica, $Si_3N_4$, magnesia, alumina and mullite; and composite materials comprising ceramic materials and plastic materials.

In the present invention, the melting temperature of an electrically insulating material is measured by differential scanning calorimetry (DSC) method. Specifically, the melting temperature of an electrically insulating material is determined from the endothermic peak value of a DSC curve obtained by means of a differential scanning calorimeter "DSC7" (manufactured and sold by Perkin Elmer cetus Co., Ltd., U.S.A.) by a method in which the temperature of the material is elevated at a temperature elevation rate of 5° C./min.

It is preferred that the thickness of the optional intermediate electrically insulating material layer disposed between the inner thermoplastic resin layer and the middle metal foil layer is selected in accordance with the desired strength of the casing and the desired weight reduction of the casing. Specifically, the thickness of the intermediate electrically insulating material layer is preferably in the range of from 1 to 100 μm, more preferably from 2 to 80 μm, most preferably from 4 to 50 μm.

In view of the high moisture resistance and high flame retardancy, a polyvinylidene chloride resin is preferred for an electrically insulating material layer and the inner thermoplastic resin layer. Further, by using a polyvinylidene chloride resin for an electrically insulating material layer and the inner thermoplastic resin layer, there can be prevented a lowering of the moisture resistance even when a pinhole is present in the middle metal foil layer. Therefore, the use of a polyvinylidene chloride resin is commercially advantageous in that not only the reliability of the battery but also the productivity of the production process for the battery can be increased.

As a polyvinylidene chloride resin, there can be mentioned a copolymer comprised of 70 to 98% by weight of vinylidene chloride units and 30 to 2% by weight of units of at least one comonomer copolymerizable with vinylidene chloride. The comonomer is selected from the group consisting of unsaturated monomers, such as vinyl chloride, acrylonitrile, acrylic acid, methacrylic acid, an alkyl acrylate in which the alkyl group has 1 to 18 carbon atoms, maleic anhydride, an alkyl maleate, itaconic acid, an alkyl itaconate and vinyl acetate. The weight average molecular weight of the vinylidene chloride copolymer is preferably in the range of from 70,000 to 150,000. From the viewpoint of achieving an excellent extrusion processability during an extrusion-molding for preparing a sheet of such a copolymer, it is preferred that the copolymer comprises 30 to 2% by weight of a comonomer selected from the group consisting of vinyl chloride, methyl acrylate, butyl acrylate and 2-ethylhexyl acrylate and 70 to 98% by weight of vinylidene chloride. From the viewpoint of achieving excellent moisture barrier properties and excellent gas barrier properties, it is more preferred that the copolymer comprises 8 to 2% by weight of methyl acrylate and 92 to 98% by weight of vinylidene chloride.

As a polyvinylidene chloride resin in the form of a sheet, use may be made of a sheet generally known as a "K-coat film", which is obtained by coating an emulsion of the above-mentioned polyvinylidene chloride resin onto a sheet of polyethylene terephthalate, nylon or polypropylene.

In the present invention, the term "terminal" means a body of an electroconductive material, which electrically connects the electrochemical cell to an electrical equipment present outside of the casing. In the battery of the present invention, terminals extend through and protrude from the terminal-withdrawal sites in the elongated, hermetic adhesion area (in which the opposite inner thermoplastic resin layers are melt-adhered to each other) toward the outside of the pouchy casing. Examples of materials used for the terminals include metals, such as a SUS, nickel, aluminum, copper, a nickel-plated SUS, iron and a copper/SUS clad; and electroconductive films. From the viewpoint of obtaining a low electrical resistance and a high mechanical strength, metals are preferred as materials for the terminals. Among the above-mentioned metals, from the viewpoint of ease in connecting the terminals to an outside equipment or an outside circuit, preferred are nickel, aluminum and copper, and especially preferred are aluminum and copper. When the battery of the present invention is a lithium ion battery, it is especially preferred that an aluminum terminal is used for the cathode (since an aluminum terminal is advantageous for an oxidation at the cathode) and that a copper terminal is used for the anode (since a copper terminal is advantageous for a reduction at the anode). Terminals made of aluminum or copper are likely to be bent during the handling and use of a battery having such terminals, as compared to terminals made of a hard metal, such as a SUS. Therefore, when a conventional battery having a laminate-type casing has terminals made of aluminum or copper, a short-circuiting between the terminals and the metal foil layer of the casing is likely to occur at the terminal-withdrawal sites. By contrast, even when the battery of the present invention has terminals made of aluminum or copper, a short-circuiting between the terminals and the metal foil layer of the casing can be surely prevented. Further, with respect to the battery of the present invention, the terminals can be intentionally bent at the terminal-withdrawal sites without the occurrence of a short-circuiting between the terminals and the metal foil layer of the casing. Therefore, if desired, the projection area of the battery can be reduced by folding the terminals at the terminal-withdrawal sites toward the middle portion of the battery, thereby improving the volume energy density of the battery.

It is preferred that at least a part of the surface of a terminal made of a metal is roughened. When the terminals have a roughened surface, the strength of the hermetic seal of the casing at the terminal-withdrawal sites can be increased, thereby greatly improving not only the air tightness of the battery but also the prevention of a leaking-out of the electrolytic liquid. This point is explained below. The hermetic seal of the casing tends to be damaged especially when a part of the electrolytic liquid leaks from the electrochemical cell enveloped by the pouchy casing. That is, the electrolytic liquid which has leaked from the electrochemical cell is likely to enter the interface between the terminals and the thermoplastic resin layer at the terminal-withdrawal sites in the elongated, hermetic adhesion area, thereby lowering the adhesion between the terminals and the thermoplastic resin layer, so that a problem arises that not only a lowering of the air tightness of the battery but also a leaking-out of the electrolytic liquid occurs. The use of metal terminals having a roughened surface can prevent the occurrence of the above-mentioned problem. It is desired that the roughened part of the surface of the terminal covers at least a part of, more advantageously all of the interface between the terminal and the inner thermoplastic resin layer at the terminal-withdrawal sites in the elongated, hermetic adhesion area. From the viewpoint of the productivity of the production process for the battery, it is more preferred that the entire surface of the terminal is roughened.

With respect to the shape of the terminals, for example, the terminals may be in the form of a rod, a strip, a band, a sheet, a coil, a mesh or the like. The shape of the terminals is not limited to the above-mentioned examples, and the shape of the terminals can be appropriately selected, taking into consideration the shape of the battery and the materials used for producing the battery. It is preferred that the size of the terminals is selected, taking into consideration the desired upper limit of the electrical resistance of the terminals and the desired strength of the terminals. For example, when the terminal is in the form of a sheet, the thickness of the terminal is preferably in the range of from 5 to 100 μm, more preferably from 6 to 80 μm, most preferably from 7 to 60 μm, and the width of the terminal is preferably in the range of from 2 to 30 mm, more preferably from 3 to 25 mm, most preferably from 4 to 20 mm. However, the size of the terminal is not limited to the size as described above, and may be appropriately selected, considering the size of the battery, the materials used for the casing, the desired upper limit of the electrical resistance of the terminals, and the like.

With respect to the method for roughening the surface of the terminal, for example, the roughening can be conducted by a chemical treatment, a mechanical treatment or the like.

Examples of chemical treatments used for roughening the surface of the terminal include an etching treatment using a solution obtained by dissolving an acid, an alkali or the like in an appropriate solvent. For example, when the terminal is made of copper, the etching treatment can be performed using nitric acid, a solution of ferric chloride, or the like; when the terminal is made of aluminum, the etching treatment can be performed using a sodium hydroxide solution, a phosphoric acid solution or the like; and when the terminal is made of a SUS, the etching treatment can be performed using sulfuric acid or the like. Further, depending on the oxidation potential of the metal terminal, it is possible to roughen the surface of the metal terminal by subjecting it to cathode oxidation in an electrolytic liquid. The roughening method utilizing cathode oxidation is preferred for roughening a terminal made of copper or aluminum since copper and aluminum are susceptible to cathode oxidation.

Examples of mechanical treatments used for roughening the surface of the terminal include a method in which the surface of the terminal is subjected to scraping by means of, for example, a rasp, a whetstone containing a vinyl polymer as a binder, a belt sander or a scratch wheel.

As a further example of methods for roughening the surface of a terminal, there can be mentioned a plasma etching. The method for roughening the surface of the metal terminal is not limited to the above-mentioned examples, and can be appropriately selected considering the material used for the terminal.

With respect to the measurement of the surface roughness of a metal terminal, the measurement can be conducted using an instrument having a stylus, an instrument utilizing the light wave interference, and the like. In the present invention, when the terminal is in the form of a sheet, the surface roughness thereof can be determined by a method in which a sample having a size of 1.5 cm×4.5 cm is prepared, and the surface roughness of the sample is measured using a stylus type surface roughness measuring instrument ("alpha-step 200", manufactured and sold by TENCOR INSTRUMENTS, U.S.A.) under conditions wherein the scanning width is 0.4 mm and the scanning rate is 1 sec/μm. When the terminal is in a form other than a sheet, the surface roughness thereof can be measured in accordance with JIS B0652-1973 by a surface roughness measuring instrument utilizing the light wave interference.

In the present invention, with respect to a terminal which is in the form of a sheet, when the surface of the terminal is referred to as being "roughened", it means that the surface of the terminal has a roughness (Ra) of 0.3 μm or more or a total indicator runout (TIR) value of 2 μm or more, each as measured using the above-mentioned stylus type surface roughness measuring instrument. The Ra value of the sheet form terminal is preferably in the range of from 0.34 to 30 μm, and the TIR value of the sheet form terminal is preferably in the range of from 2.5 to 30 μm.

In the present invention, with respect to a terminal which is in a form other than a sheet, when the surface of the terminal is referred to as being "roughened", it means that the surface of the terminal has a maximum roughness (Rmax) of 2 μm or more, preferably 2.5 μm or more, as measured in accordance with JIS B0652-1973 by a surface roughness measuring instrument utilizing the light wave interference.

In general, it is preferred that the water permeability of a casing for a non-aqueous battery of a thin configuration is as low as possible. With respect to the casing used in the battery of the present invention, the water permeability of the casing is preferably 1 $g/m^2$ 24 hours or less, more preferably 0.2 $g/m^2$ 24 hours or less, most preferably 0.1 $g/m^2$ 24 hours or less. When a casing having a water permeability of more than 1 $g/m^2$ 24 hours is used, the electrochemical cell enveloped by the casing absorbs water which enters the inside of the casing, and the absorbed water causes a deterioration of the electrochemical cell and a lowering of the battery capacity. Further, it is possible that the water absorbed by the electrochemical cell causes a decomposition of the electrolyte in the cell and a gas is generated by the decomposition of the electrolyte. The water permeability of the casing can be determined by a method comprising filling the inside of the casing with a predetermined weight of a water-absorptive material, such as calcium chloride anhydride, followed by a hermetic sealing of the casing; maintaining the resultant sealed casing containing a water-absorptive material in a moisture-containing atmosphere for a predetermined time; and measuring the difference in the weight of the sealed casing (containing the water-absorptive material) before and after the maintenance thereof in the above-mentioned atmosphere.

In the process for producing the battery of the present invention, the melt-adhesion for hermetically sealing the casing may be performed while maintaining the inside of the casing under vacuum. By maintaining the inside of the casing under vacuum during the melt-adhesion for sealing the casing, the electrochemical cell can be tightly enveloped by the casing, so that not only can the electrochemical cell be securely held at a certain position in the casing but also the heat dissipation from the electrochemical cell can be improved. With respect to the method for sealing the casing while maintaining the inside of the casing under vacuum, there can be mentioned a method in which the inside of a non-sealed casing containing an electrochemical cell is deaerated through a nozzle and, immediately thereafter, the casing is sealed by melt-adhesion, and a method in which a non-sealed casing containing an electrochemical cell is placed in an airtight chamber, and the atmosphere of the airtight chamber is evacuated, followed by a sealing of the casing by melt-adhesion.

The non-aqueous battery of a thin configuration of the present invention is advantageous when the electrochemical cell enveloped by the casing is of a lithium type or a lithium ion type, and especially advantageous when the electrochemical cell is of a lithium ion type. A lithium ion battery is comprised of a cathode, an anode, a separator disposed between and connected to the cathode and the anode wherein the separator is capable of passing lithium ions therethrough, an electrolyte, terminals and a casing. In such a battery, each electrode has a structure in which a current collector has thereon an electrode active material, and the current collector is connected to a terminal (see, for example, U.S. Pat. No. 4,997,732).

Examples of methods for connecting a terminal to a current collector include ultrasonic welding, resistance welding, and laser welding. The connection between a terminal and a current collector can be made either before or after the assembly of the electrochemical cell. The battery of the present invention encompasses a battery having a structure wherein each of the cathode current collector and the anode current collector is connected to at least one corresponding terminal or a plurality of corresponding terminals; and a battery having a structure wherein a plurality of unit cells each comprising a laminate of a "cathode/separator/anode" structure are connected to each other in parallel or in series and terminals are connected to the current collectors.

In the battery of the present invention, an absorbent for carbon dioxide may be placed inside the casing so as to suppress an increase in the internal pressure. By suppressing an increase in the internal pressure, the air tightness of the battery can be maintained for a prolonged period of time.

Examples of absorbents for carbon dioxide include hydroxides or oxides of metals belonging to Group I or II of the Periodic Table, such as LiOH, NaOH, KOH, $Ca(OH)_2$, $Ba(OH)_2$, $Li_2O$, CaO and ascarite; and synthetic zeolites which can serve as a molecular sieve, such as the molecular sieves sold by the trade names of Molecular sieve 4A, Zeolam A-4, and Molecurite A-430. These absorbents for carbon dioxide not only have a high absorbing ability for carbon dioxide, but are also easy to handle because they are solid. The manner of use of the absorbents for carbon dioxide is as follows. For example, an absorbent (for carbon dioxide) in the form of pellets, particles or a powder is wrapped in a resin film having a high gas permeability (such as poly(perfluoroolefin sulfonic acid (trade name: Nafion), cellophane, a polyethylene film, a polypropylene film or a stretched polyethylene film), and the absorbent wrapped in the resin film is put into the pouchy casing together with the electrochemical cell. Alternatively, an absorbent for carbon dioxide may be used in the form of a dispersion thereof in an electrolytic liquid, a solid electrolyte or an electrode active material.

When the electrochemical cell inside the casing undergoes an overcharge, a discharge of a large amount of current or an abnormal reaction due to a short-circuiting, the cell frequently generates a gas by a chemical reaction or by an abnormal rise in the internal temperature. In a preferred embodiment of the present invention, even when such a gas generation occurs inside the battery, the battery exhibits advantages not only in that an expansion-distortion of the casing can be suppressed to a minimum, thus preventing the equipment containing the battery from suffering a damage, but also in that, by promoting the heat conduction from the electrochemical cell to the casing, the battery can be prevented from undergoing a thermal runaway and hence maintained in a safe condition. In the battery of the present invention, for suppressing an increase in the internal pressure due to a gas generation (from abnormal reactions or the like) inside the battery, the battery may have gas-release means adapted to be actuated to release at least a part of the generated gas when the internal pressure exceeds the external pressure. As such gas-release means, for example, a safety valve provided in the wall of the casing can be effectively employed. As a safety valve, there can be mentioned a valve which can be opened to communicate the inside and the outside of the casing to each other and which has a structure wherein a holder portion of the valve is secured to the casing and the opening means thereof is actuated by a spring or a magnetic coupling. When the internal pressure of the battery has increased to a predetermined high level, the valve is automatically opened to thereby release the gas inside the casing to the outside of the casing. Further, depending on the type of the opening means of the safety valve, the internal pressure required for actuating the opening means can be lowered when the internal temperature of the battery is at a temperature which is the same as or higher than the predetermined high temperature. Examples of means for actuating the opening means of the valve include a spring, a push plate, and a magnetic coupling. The pressure required for opening the valve can be appropriately set by selecting the area of the opening and the stress required for opening the valve. Alternatively, the gas-release when the internal pressure has reached a predetermined high level can also be achieved by a method in which, before the melt-adhesion for sealing the casing, a thin film exhibiting a relatively low adhesion to the inner thermoplastic resin layer of the laminate is interposed between the opposite sheets of the laminates (each having the thermoplastic resin layer as the innermost layer) at a position corresponding to a portion of the elongated, hermetic adhesion area to be formed.

Further, the battery of the present invention may contain means to break the electrical connection between the terminals and the electrochemical cell in response to a change caused by an increase in the internal pressure and/or internal temperature of the battery. Specifically, the battery of the present invention may contain means adapted to be actuated to cut at least a part of the terminal when the pouchy casing suffers expansion and distortion. Such means will prevent a fire, an explosion, a thermal runaway and the like even when an accident occurs in the battery, thereby improving the safety of the battery.

With respect to the means adapted to be actuated to cut at least a part of the terminal in response to the occurrence of expansion and distortion of the casing, such means can be realized by, for example, any of the following structures (1) to (3):

(1) a structure wherein the terminal is made of a laminate comprised of two or more layers of flat metal sheets which can be peeled off from each other, and one of the outermost layers of the terminal has the inner end thereof connected to the electrochemical cell and has the outer end thereof terminating inside the casing, and the other outermost layer of the terminal has the outer end thereof leading to the outside of the casing and has the inner end thereof not connected to the electrochemical cell, and wherein both outermost layers of the terminal are, respectively, fixedly adhered to the opposite inner thermoplastic resin layers of the casing;

(2) a structure wherein a middle portion of the terminal, which is positioned in the casing, has a low breaking strength, and portions of the terminal which are, respectively, positioned on the inner and outer sides of, and in adjacent to, the middle portion (having a low breaking strength) are, respectively, fixedly adhered to the opposite inner thermoplastic resin layers of the casing; and (3) a structure wherein both terminals connected to the cathode and the anode of the electrochemical cell are, respectively, fixedly adhered to the opposite inner thermoplastic resin layers of the casing.

With respect to the above-mentioned structure (1), the lamination of the flat metal sheets for producing the laminate type terminal can be performed by welding, such ultrasonic welding, laser welding and spot welding, or by using, as an adhesive, an electrically conductive coating material. The adhesion strength between the layers of flat metal sheets can be adjusted by selecting the lamination method, connecting materials used for the lamination and the area of a connected portion between adjacent layers of the laminate.

With respect to the above-mentioned structure (2), the. middle portion of the terminal which portion has a low breaking strength can be provided, for example, by a method in which a middle portion of the terminal is partly cut (nicked) so as to cause the terminal to have a reduced cross-sectional area at the middle portion, and a method in which the terminal is produced using two types of metals having different breaking strengths, wherein a middle portion of the terminal is formed using the metal having a lower breaking strength, and the inner and outer sides of the middle portion are formed using the other metal having a higher breaking strength.

With respect to the above-mentioned structure (3), the stress required for breaking at least a part of the terminal can be adjusted by adjusting the adhesion strength between the terminal and the current collector of or the electrode active material of the electrode laminate in the electrochemical cell.

For providing any of the above-mentioned structures (1) to (3), it is necessary that one surface of a portion of the terminal be fixedly adhered to one of the opposite inner thermoplastic resin layers of the casing. while preventing the other surface of the same portion of the terminal from being fixedly adhered to the other of the opposite inner thermoplastic resin layers of the casing. A fixed adhesion between an inner thermoplastic resin layer of the casing and a surface of the terminal can be achieved by a method in which an inner thermoplastic resin layer of the casing is directly melt-adhered to a surface of the terminal. On the other hand, a non-fixed separable adhesion between an inner thermoplastic resin layer of the casing and a surface of the terminal can be achieved by a method in which, before melt-adhering the inner thermoplastic resin layer to the terminal, a portion of the terminal which portion should be prevented from being fixedly adhered to the inner thermoplastic resin layer is covered with a powder or a sheet of a material exhibiting a poor adhesion to the inner thermoplastic resin layer. Examples of materials exhibiting a poor adhesion to the inner thermoplastic resin layer include fluororesins, such as polytetrafluoroethylene (trade name: Teflon). There is no particular limitation with respect to the breaking strength of the part of the terminal to be cut when the casing suffers expansion and distortion, and the appropriate breaking strength varies depending on the capacity and structure of the battery. However, the appropriate breaking strength is preferably in the range of from 10 g to 50 kg.

Further, an element capable of breaking the electrical connection between the terminal and the electrochemical cell in response to an increase in the internal temperature (i.e.; PTC element) can be connected to the terminal. The PTC element contains a composition comprising an electrically conductive filler and an electrically insulating resin. The PTC element functions by utilizing a difference in thermal expansion coefficient between the electrically conductive filler and the electrically insulating resin. When the PTC element is exposed to a high temperature, the PTC element exhibits an increased electrical resistance and thus breaks the electrical connection between the terminal and the electrochemical cell. In general, the PTC element is comprised of a three-layer laminate of a flat metal sheet, a layer of a composition comprising an electrically conductive filler and an electrically insulating resin and a flat metal sheet, and it can be connected to the terminal as a part thereof either inside or outside the battery casing.

Alternatively, the function of the PTC element can also be achieved by using a terminal having a laminate structure wherein at least two elongated flat metal sheets are laminated through a composite material layer comprising an electrically conductive adhesive or an electrically conductive adhesive tape, an electrically conductive filler and an electrically insulating resin, wherein one of the outermost elongated metal sheets has the inner end thereof connected to the electrochemical cell and has the outer end thereof terminating inside the casing, and the other outermost elongated metal sheet has the outer end thereof leading to the outside of the casing and has the inner end thereof not connected to the electrochemical cell. The value of electric resistance which is exhibited when this terminal is exposed to a high temperature, and the temperature at which this terminal exhibits an sharp increase in the electric resistance thereof can be adjusted by changing the formulation of the composite material layer, i.e., the type and amount of the electrically conductive filler (e.g., a powder of a metal, such as silver or copper), the type and amount of the electrically insulating resin (such as phenol resin or an epoxy resin), the type and amount of the electrically conductive adhesive, the type and amount of the electrically conductive adhesive tape, and the area covered by the adhesive or the tape. Thus, the internal resistance of the battery and the operation temperature thereof can be controlled by using the above terminal. Different types of metals can be easily connected to each other by conventional methods. For example, when a nickel foil is adhered to one end portion of an aluminum terminal by using an electrically conductive tape, it becomes easy to perform a soldering on this end portion of the terminal, so that it becomes easy to connect the end portion of the terminal to an outside equipment by soldering. This soldering method can also be used for the lamination of the flat metal sheets mentioned in connection with the above-mentioned structure (1) for realizing the means adapted to be actuated to cut at least a part of the terminal in response to the occurrence of expansion and distortion of the casing.

When the battery of the present invention is a lithium battery or a lithium ion battery, nickel or aluminum is used as a cathode current collector, and copper is used as an anode current collector. Examples of cathode active materials include compound oxides of alkali metals, such as $LiCoO_2$; compound oxides of alkali metals with non-alkali metal oxides (such as $MnO_2$) or non-alkali metal hydroxides; oxides of vanadium, such as $V_2O_5$; oxides of chromium, such as $Cr_2O_5$; dichalcogenides of transition metals, such as $TiS_2$, $MoS_2$ and $FeS_2$; trichalcogenides of transition metals, such as $NbSe_3$; Chevrel compounds ($A_xMo_6Y_8$, wherein A=Li or Cu, and Y=S or Se); organic compounds, such as polypyrrole, and disulfide derivatives; and mixtures thereof.

Examples of anode active materials include metal lithium; lithium alloys; carbonaceous materials which are capable of occluding lithium, such as a needle coke and a graphite; lithium solid solutions of metal oxides, such as tin compound oxides; electrically conductive polymers capable of doping and dedoping lithium. In the electrochemical cell of the battery of the present invention, the cathode and the anode are connected to each other through a separator, and the separator is made of a material capable of passing ions therethrough.

As examples of the ion transfer medium employed in the separator disposed between the cathode and the anode, there can be mentioned a liquid electrolyte, a gel type electrolyte and a solid electrolyte. A gel type electrolyte is comprised of a matrix polymer material, an organic solvent and a solute. Examples of matrix polymer materials include a polyvinylidene fluoride polymer and a polyacrylonitrile polymer; examples of organic solvents include ethylene carbonate, propylene carbonate, γ-butyrolactone, 1,2-dimethoxyethane, tetrahydrofuran; and examples of solutes include $LiClO_4$, $LiPF_6$ and $LiBP_4$.

BEST MODE FOR CARRYING OUT THE INVENTION

The present invention will be described in more detail with reference to Examples and Comparative Examples, which should not be construed as limiting the scope of the present invention.

In the following Examples and Comparative Examples, the terms "positive electrode" and "negative electrode" are used instead of the terms "cathode" and "anode", respectively.

EXAMPLE 1

A powder of lithium cobalt oxide ($LiCoO_2$; average particle diameter: 10 μm) and carbon black were added to and dispersed in a 5% by weight solution of polyvinylidene fluoride (as a binder) in N-methylpyrrolidone (NMP), so that a mixture containing solid components in the following dry weight ratio was obtained: $LiCoO_2$ (85%), carbon black (8%) and polyvinylidene fluoride (7%). The obtained mixture was applied onto an aluminum sheet (thickness: 15 μm) (as a current collector) and dried, followed by heat-pressing, to thereby prepare a positive electrode layer having a thickness of 115 μm and a density of 2.8 g/cm³. The aluminum sheet having the prepared positive electrode layer thereon was used as a positive electrode sheet. A powder of needle coke (NC) having an average particle diameter of 12 μm was homogeneously mixed with a 5% by weight solution of polyvinylidene fluoride in NMP, thereby obtaining a slurry (NC/polymer dry weight ratio=92:8). The obtained slurry was applied onto a copper sheet (as a current collector) by doctor blade method and dried, followed by heat-pressing, to thereby prepare a negative electrode layer having a thickness of 125 μm and a density of 1.2 g/cm³. The copper sheet having the prepared negative electrode layer thereon was used as a negative electrode sheet.

A hexafluoropropylene/vinylidene fluoride copolymer resin (hexafluoropropylene content: 5% by weight) was subjected to extrusion molding by means of an extruder (manufactured and sold by Toshiba Machine Co., Ltd., Japan) at an extrusion die temperature of 230° C., thereby preparing a sheet having a thickness of 150 μm. The prepared sheet was irradiated with electron beams (irradiation dose: 10 Mrads) to thereby obtain a crosslinked sheet, and then, the crosslinked sheet was vacuum dried at 60° C. to remove by-produced hydrogen fluoride (HF) gas. The crosslinked sheet was further irradiated with electron beams (irradiation dose: 15 Mrads), and subsequently, the irradiated crosslinked sheet was immersed in a mixture of flon HFC134a and water (flon/water weight ratio=99:1), using a tightly sealed container, at 70° C. under a pressure of 20 kg/cm² for 24 hours, thereby obtaining an impregnated sheet (liquid content: 6.5% by weight). The impregnated sheet was taken out from the container and, immediately thereupon, placed in an oven maintained at 210° C. to thereby heat the impregnated sheet to 180° C. over 10 sec. As a result, a white porous sheet having a thickness of 270 μm (expansion ratio: 8 times) was obtained. The ratio of closed cells in the porous sheet was 87% by volume as measured by means of 930 type air-comparison gravimeter (manufactured and sold by Toshiba Beckman Co., Ltd., Japan). The obtained porous sheet was immersed in a non-aqueous electrolytic solution obtained by dissolving lithium tetrafluoroborate ($LiBF_4$) in a mixed solution of ethylene carbonate (EC), propylene carbonate (PC) and γ-butyrolactone (γ-BL) (EC/PC/γ-BL weight ratio=1:1:2, and $LiBF_4$ concentration: 1 mol/liter) at 100° C. for 2 hours to thereby impregnate and swell the porous sheet with the electrolytic solution. The thickness of the impregnated porous sheet was 350 μm, and this sheet was used as a hybrid solid electrolyte sheet.

The following operations were conducted in an atmosphere having a dew point of −50° C. or less.

Each of the positive electrode sheet (having the positive electrode layer on one side thereof) and the negative electrode sheet (having the negative electrode layer on one side thereof) was fabricated so as to have a size of 6 cm×50 cm. The hybrid solid electrolyte sheet was fabricated so as to have a size of 6.5 cm×52 cm. Then, the thus obtained positive electrode sheet, hybrid solid electrolyte sheet and negative electrode sheet were laminated so that the hybrid solid electrolyte sheet was interposed between the positive and negative electrode sheets, and the positive electrode layer of the positive electrode sheet and the negative electrode layer of the negative electrode sheet were opposite to each other through the hybrid solid electrolyte sheet, thereby obtaining a positive electrode/electrolyte/negative electrode laminate. A rigid aluminum foil having a width of 1 cm, a length of 10 cm and a thickness of 50 μm (Ra=0.16 μm and TIR=0.73 μm) as a positive terminal, and a rigid milled copper foil having a width of 1 cm, a length of 10 cm and a thickness of 50 μm (Ra=0.07 μm and TIR=0.91 μm) as a negative terminal were respectively connected to the current collectors of the positive and negative electrode sheets which are both outermost layers of the positive electrode/electrolyte/negative electrode laminate by means of an ultrasonic metal welder (USW-200Z38S, manufactured and sold by Ultrasonic Engineering Co., Ltd., Japan). The terminals were, respectively, connected to the current collectors so that the center of the longitudinal axis of the terminal is positioned in a 6 cm-side of the current collector at a distance of 2 cm from one end of the width (namely, at a distance of 4 cm from the other end of the width) of the electrode sheet. Next, the positive electrode/electrolyte/negative electrode laminate with the terminals (namely, electrode assembly having a length of 50 cm) were accordion folded at intervals of 10 cm so as to have five folds, thereby obtaining an electrochemical cell.

A laminate shown in FIGS. 1(a) and 1(b) for producing a pouchy casing of a battery was prepared in the following manner. Three different sheets respectively of a stretched nylon film (trade name: Unilon, manufactured and sold by Idemitsu Petrochemical Co., Ltd., Japan) having a length of 18 cm, a width of 14 cm and a thickness of 15 μm; an aluminum foil having a length of 18 cm, a width of 14 cm and a thickness of 7 μm; and an L-LDPE film (trade name: LS-700C, manufactured and sold by Idemitsu Petrochemical Co., Ltd., Japan) having a length of 18 cm, a width of 14 cm and a thickness of 50 μm, were put one upon another in this order, in which the sheets were adhered using a two-pack urethane adhesive to obtain a laminate. Prior to the lamination, portions of the 18 cm-side of the aluminum foil in the laminate were partly cut-out with respect to the peripheral edge thereof to form cut-out portions each having a width (in a direction parallel to the peripheral edge) of 11 mm and a depth (in a direction perpendicular to the peripheral edge) of 0.5 mm, wherein the cut-out portions correspond to the terminal withdrawal sites. The laminate was folded in two about a folding line ]1 as shown in FIG. 1(a), thereby obtaining a folded laminate having a size of 0.9 cm×14 cm. With respect to each of three pairs of opposite sides (i.e., a pair of opposite 9 cm-sides free of cut-out portions and two pairs of opposite 14 cm-sides) of the folded laminate, the opposite sides were melt-adhered to each other over a width of 10 mm from the peripheral edge thereof by heating at 140° C. for 6 seconds to thereby form a hermetic seal, thus providing a pouchy casing having an opening in the remaining pair of opposite 9 cm-sides and having terminal-withdrawal sites at the opening thereof. The electrochemical cell prepared above was placed into the obtained pouchy casing and the terminals were taken out from the opening of the pouchy casing through the terminal-withdrawal sites. The opening of the pouchy casing was hermetically sealed by heating at 120° C. under a pressure of 1 kg/cm$^2$ for 6 seconds, thereby obtaining a battery shown in FIG. 1(c). At the terminal-withdrawal sites of the pouchy casing, the width of the elongated, hermetic adhesion area was 10 mm from the peripheral edge of the pouchy casing. As mentioned above, each of the cut-out portions of the aluminum foil layer had a width of 11 mm and a depth of 0.5 mm as measured from the peripheral edge of the pouchy casing. The depth of the cut-out portion was confirmed under an optical microscope (System Metal Microscope BHT, manufactured and sold by Olympus Optical Co., Ltd., Japan) using an objective micrometer graduated in 0.01 millimeters (manufactured and sold by Olympus Optical Co., Ltd., Japan).

Five batteries having a construction as shown in FIG. 1(c) were prepared as described above. The prepared batteries were subjected to charge/discharge cycle testing using a charge/discharge testing device (Model HJ-101SM6, manufactured and sold by Hokuto Denko Corporation, Japan). All of the five batteries were capable of standard charge/discharge operation and their average discharge capacity was 900 mAh. None of the batteries charged at a constant voltage of 4.2 V suffered voltage-lowering or heat-generation caused by short-circuiting even when the terminals were folded. Further, no leakage of liquid was observed.

In addition, a pouchy casing was prepared in substantially the same manner as mentioned above, and 20 g of calcium chloride anhydride was sealed up inside the pouchy casing, instead of the electrochemical cell. The sealed pouchy casing containing calcium chloride was placed at a temperature of 60° C. and a relative humidity (RH) of 90% for 3 months, but the increase in the weight of the pouchy casing was less than 1 mg.

EXAMPLE 2

Figure 2:
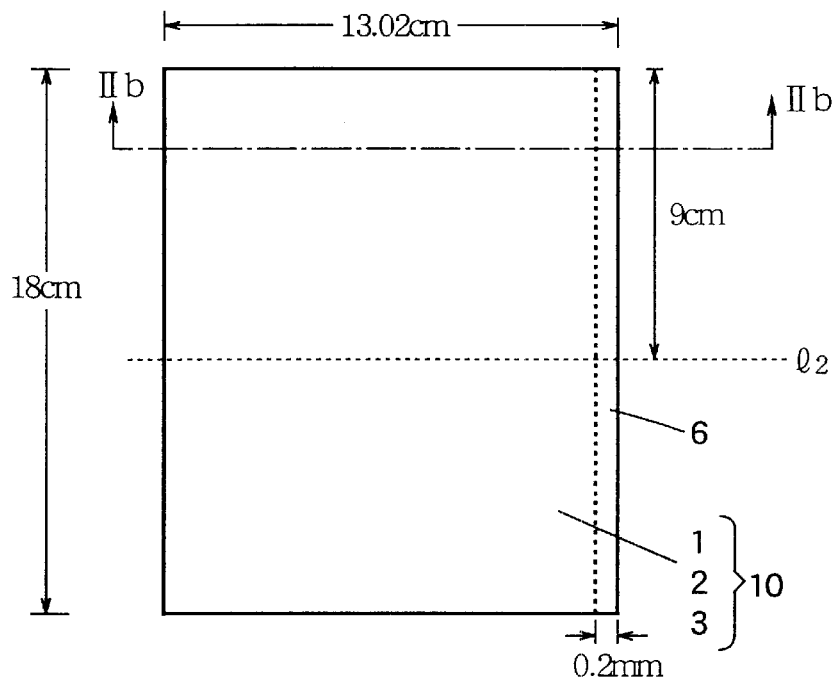
Figure 2:
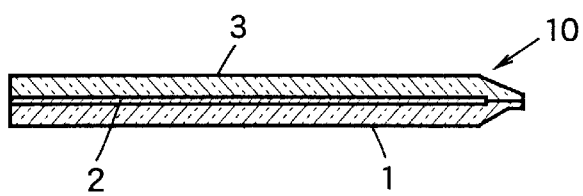
Figure 2:
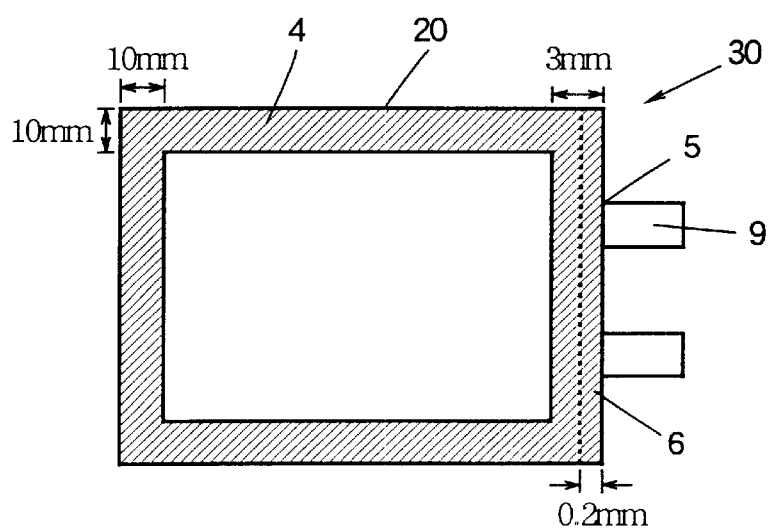

A laminate shown in FIGS. 2(a) and 2(b) for producing a pouchy casing for a battery was prepared in the following manner. Three different sheets respectively of a polyethylene terephthalate film (trade name: Melinex S, manufactured and sold by ICI Japan Ltd., Japan) having a length of 18 cm, a width of 14 cm and a thickness of 12 μm; an aluminum foil having a length of 18 cm, a width of 13 cm and a thickness of 9 μm; and an L-LDPE film (trade name: LS-700C, manufactured and sold by Idemitsu Petrochemical Co., Ltd., Japan) having a length of 18 cm, a width of 14 cm and a thickness of 50 μm, were put one upon another in this order, wherein the sheets were trued up on their respective one 18 cm-sides. The sheets were adhered using a two-pack urethane adhesive to obtain a laminate. The aluminum foil in the laminate was cut-out along the entire length of one 18 cm-side of the foil by a depth (in a direction perpendicular to the peripheral edge of the foil) of 10 mm as measured from the peripheral edge of the laminate. The thermoplastic resin layer and the electrically insulating material layer (polyethylene terephthalate film layer and L-LDPE film layer) of the laminate were cut-away using a knife along the entire length of the 18 cm-side (which is on the same side as the 10 mm cut-away side of the aluminum foil) by a depth of 0.98 cm, to thereby obtain a laminate in which the aluminum foil is cut-out along the entire length of the above-mentioned 18 cm-side of the aluminum foil layer by a depth of 0.2 mm from the peripheral edge of the laminate. {Therefore, as shown in FIG. 2(a), the size of the laminate became 18 cm×13.02 cm.} The laminate was folded in two about a folding line ]2 as shown in FIG. 2(a), thereby obtaining a folded laminate having a size of 9 cm×13.02 cm. With respect to each of three pairs of opposite sides (i.e., a pair of opposite 9 cm-sides free of a cut-out portion and two pairs of opposite 13.02 cm-sides) of the folded laminate, the opposite sides were melt-adhered to each other over a width of 10 mm from the peripheral edge thereof by heating at 140° C. for 6 seconds to thereby form a hermetic seal, thus providing a pouchy casing having an opening in the remaining pair of opposite 9 cm-sides and having terminal-withdrawal sites at the opening thereof.

An electrochemical cell prepared in substantially the same manner as in Example 1 was placed into the prepared pouchy casing and terminals were taken out of the opening of the pouchy casing through the terminal-withdrawal sites. The opening of the pouchy casing was hermetically sealed by heating at 120° C. under a pressure of 1 kg/cm$^2$ for 6 seconds, thereby obtaining a battery shown in FIG. 2(c). At the terminal-withdrawal sites of the pouchy casing, the width of the elongated, hermetic adhesion area was 3 mm from the peripheral edge of the pouchy casing. As mentioned above, the aluminum foil layer was cut-out along the entire length of the 18 cm-side of the foil by a depth of 0.2 mm as measured from the peripheral edge of the pouchy casing. The depth of the cut-out portion was confirmed under an optical microscope (System Metal Microscope BHT, manufactured and sold by Olympus Optical Co., Ltd., Japan) using an objective micrometer graduated in 0.01 millimeters (manufactured and sold by Olympus Optical Co., Ltd., Japan).

Five batteries having a construction as shown in FIG. 2(c) were prepared as described above. The prepared batteries were subjected to charge/discharge cycle testing using a charge/discharge testing device (Model HJ-101SM6, manufactured and sold by Hokuto Denko Corporation, Japan). All of the five batteries were capable of standard charge/discharge operation and their average discharge capacity was 900 mAh. None of the batteries charged at a constant voltage of 4.2 V suffered voltage-lowering or heat-generation caused by short-circuiting even when the terminals were folded. Further, no leakage of liquid was observed.

In addition, a pouchy casing was prepared in substantially the same manner as mentioned above, and 20 g of calcium chloride anhydride was sealed up inside the pouchy casing, instead of the electrochemical cell. The opening of the pouchy casing was hermetically sealed in a width of 10 mm from the peripheral edge thereof by heating at 140° C. for 6 seconds. The sealed pouchy casing containing calcium chloride was placed at a temperature of 60° C. and a relative humidity (RH) of 90% for 3 months, but the increase in the weight of the pouchy casing was less than 1 mg.

EXAMPLE 3

Figure 3:
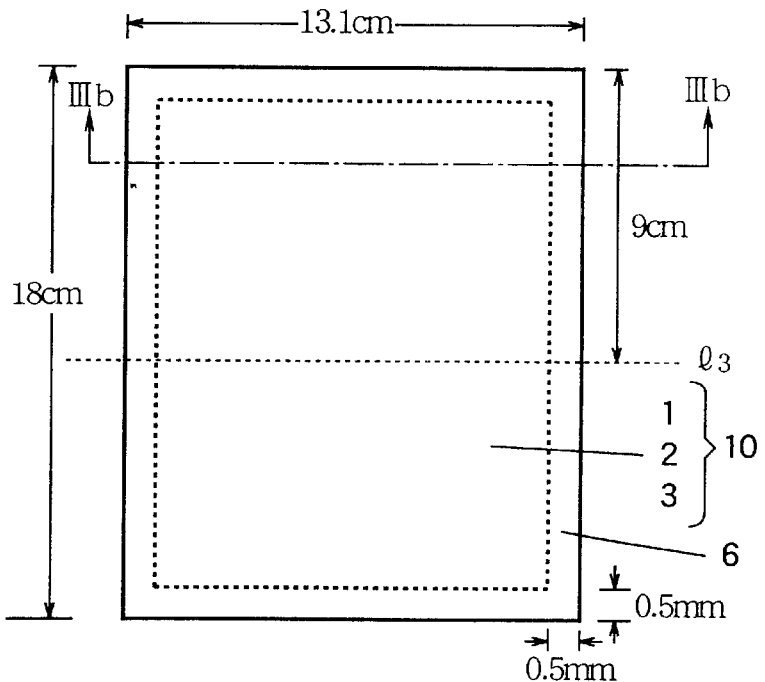
Figure 3:
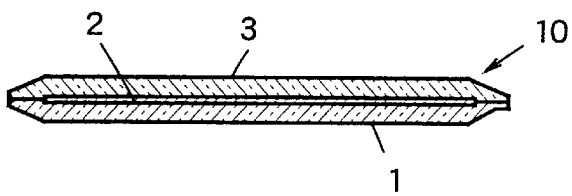
Figure 3:
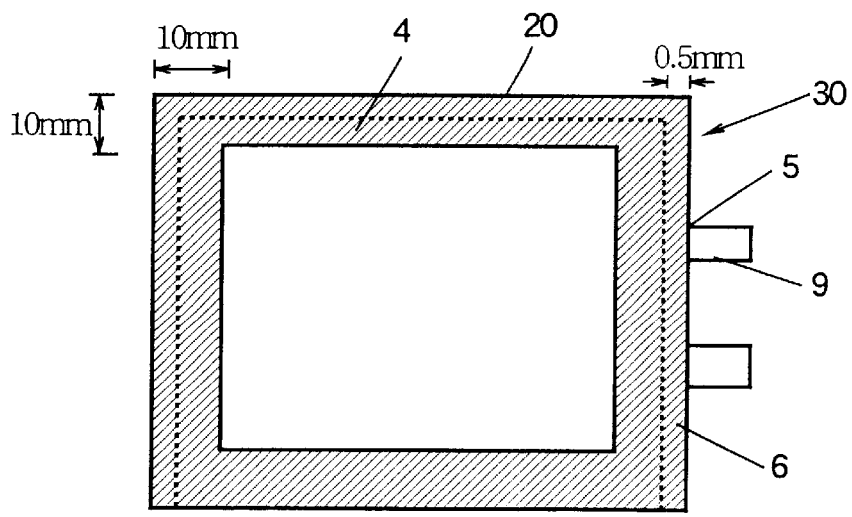

A laminate shown in FIGS. 3(a) and 3(b) for producing a pouchy casing for a battery was prepared in the following manner. Three different sheets respectively of a polyethylene terephthalate film (trade name: Melinex S, manufactured and sold by ICI Japan Ltd., Japan) having a length of 18.9 cm, a width of 14 cm and a thickness of 12 μm; an aluminum foil having a length of 17.9 cm, a width of 13 cm and a thickness of 20 μm; and a polyethylene-vinyl alcohol copolymer film (trade name: EF-HS, manufactured and sold by Kuraray Co., Ltd., Japan) having a length of 18.9 cm, a width of 14 cm and a thickness of 30 μm, were put one upon another in this order, wherein the respective centers of the three sheets were in register with one another in which the sheets were adhered using a two-pack urethane adhesive to obtain a laminate. The thermoplastic resin layer and the electrically insulating material layer (polyethylene terephthalate film layer and polyethylene-vinyl alcohol copolymer film layer) of the laminate were cut-away along the entire length of all four sides of the laminate so that the aluminum foil layer in the laminate was cut-out by a depth of 0.5 mm as measured from the peripheral edge of the laminate. {Therefore as shown in FIG. 3(a), the size of the laminate became 18 cm×13.1 cm.} The laminate was folded in two about a folding line ]3 as shown in FIG. 3(a), thereby obtaining a folded laminate having a size of 9 cm×13.1 cm. With respect to each of three pairs of opposite sides (i.e., a pair of opposite 9 cm-sides and two pairs of opposite 13.1 cm-sides) of the folded laminate, the opposite sides were melt-adhered to each other over a width of 10 mm from the peripheral edge thereof by heating at 140° C. for 6 seconds to thereby form a hermetic seal, thus providing a pouchy casing having an opening in the remaining pair of opposite 9 cm-sides and having terminal-withdrawal sites at the opening thereof.

An electrochemical cell prepared in substantially the same manner as in Example 1 was placed into the prepared pouchy casing and the terminals were taken out from the opening of the pouchy casing through the terminal-withdrawal sites. The opening of the pouchy casing was hermetically sealed by heating at 135° C. under a pressure of 1 kg/cm² for 5 seconds, thereby obtaining a battery shown in FIG. 3(c). At the terminal-withdrawal sites of the pouchy casing, the width of the elongated, hermetic adhesion area was 10 mm from the peripheral edge of the pouchy casing. As mentioned above, the aluminum foil layer was cut-out along the entire length of all four sides of the foil in a depth of 0.5 mm as measured from the peripheral edge of the pouchy casing. The depth of the removed portion was confirmed under an optical microscope (System Metal Microscope BHT, manufactured and sold by Olympus Optical Co., Ltd., Japan) using an objective micrometer graduated in 0.01 millimeters (manufactured and sold by Olympus Optical Co., Ltd., Japan).

Five batteries having a construction as shown in FIG. 3(c) were prepared as described above. The prepared batteries were subjected to charge/discharge cycle testing using a charge/discharge testing device (Model HJ-101SM6, manufactured and sold by Hokuto Denko Corporation, Japan). All of the five batteries were capable of standard charge/discharge operation and their average discharge capacity was 900 mAh. None of the batteries charged at a constant voltage of 4.2 V suffered voltage-lowering or heat-generation caused by short-circuiting even when the terminals were folded. Further, no leakage of liquid was observed.

In addition, a pouchy casing was prepared in substantially the same manner as mentioned above, and 20 g of calcium chloride anhydride was sealed up inside the pouchy casing, instead of the electrochemical cell. The opening of the pouchy casing was hermetically sealed in a width of 10 mm from the peripheral edge thereof by heating at 140° C. for 6 seconds. The sealed pouchy casing containing calcium chloride was placed at a temperature of 60° C. and a relative humidity (RH) of 90% for 3 months, but the increase in the weight of the pouchy casing was less than 1 mg.

EXAMPLE 4

A laminate was prepared in the following manner. Three different sheets respectively of a polyimide film (trade name: Kapton, manufactured and sold by Du Pont-Toray Co., Ltd., Japan) having a length of 18 cm, a width of 14 cm and a thickness of 12.5 μm; an aluminum foil having a length of 18 cm, a width of 13 cm and a thickness of 20 μm; and a heat adhesive polybutylene terephthalate film (trade name: Estina, manufactured and sold by Sekisui Chemical Co., Ltd., Japan) having a length of 18 cm, a width of 14 cm and a thickness of 30 μm, were put one upon another in this order, wherein the sheets were trued up on their respective one 18 cm-sides. The sheets were adhered using a two-pack urethane adhesive to obtain a laminate. With respect to the polyimide film used in the laminate, the polyimide film exhibited no melting temperature as measured by DSC method. The aluminum foil in the laminate was cut-out along the entire length of one 18 cm-side of the foil by a depth (in a direction perpendicular to the peripheral edge of the foil) of 10 mm as measured from the peripheral edge of the laminate. The laminate was folded in two about a central line perpendicularly traversing both 18 cm-sides thereof, thereby obtaining a folded laminate having a size of 9 cm×14 cm. With respect to each of two pairs of opposite sides (i.e., a pair of opposite 9 cm-sides free of a cut-out portion and two pairs of opposite 14 cm-sides) of the folded laminate, the opposite sides were melt-adhered to each other over a width of 10 mm from the peripheral edge thereof by heating at 180° C. for 8 seconds to thereby form a hermetic seal, thus providing a pouchy casing having an opening in the remaining pair of opposite 9 cm-sides and having terminal-withdrawal sites at the opening thereof. An electrochemical cell prepared in substantially the same manner as in Example 1 was placed into the prepared pouchy casing and the terminals were taken out of the opening of the pouchy casing through the terminal-withdrawal sites. The opening of the pouchy casing was hermetically sealed by heating at 185° C. for 5 seconds, thereby obtaining a battery. At the terminal-withdrawal sites of the pouchy casing, the width of the elongated, hermetic adhesion area was 20 mm from the peripheral edge of the pouchy casing. As mentioned above, the aluminum foil layer was cut-out along the entire length of the 18 cm-side of the foil by a depth of 10 mm as measured from the peripheral edge of the pouchy casing. The depth of the cut-out portion was confirmed using a scale graduated in 1 millimeters.

Five batteries were prepared as described above. All of the five batteries were capable of standard charge/discharge operation and their average discharge capacity was 900 mAh. None of the batteries charged at a constant voltage of 4.2 V suffered voltage-lowering and heat-generation caused by short-circuiting even when the terminals were folded. Further, no leakage of liquid was observed.

When a battery having a capacity of 905 mAh was charged at a constant voltage of 4.2 V and was placed in an oven (250° C.), gas effused from the adhesion area between the terminals and the laminate of the pouchy casing, but the laminate did not catch fire. In addition, when a battery having a capacity of 850 mAh was subjected to a charging operation at a constant current of 1.8 A, gas effusion was observed, but the laminate did not catch fire.

EXAMPLE 5

A laminate was prepared in the following manner. Four different sheets respectively of a polyethylene terephthalate film (trade name: Melinex S, manufactured and sold by ICI Japan Ltd., Japan) having a length of 18 cm, a width of 14 cm and a thickness of 12 μm; an aluminum foil having a length of 18 cm, a width of 13 cm and a thickness of 9 μm; a polyethylene terephthalate film (trade name: Melinex S, manufactured and sold by ICI Japan Ltd., Japan) having a length of 18 cm, a width of 14 cm and a thickness of 12 μm; and a polypropylene film (trade name: Taikoh FC, manufactured and sold by Futamura Chemical Industries Co., Ltd., Japan) having a length of 18 cm, a width of 14 cm and a thickness of 40 μm, were put one upon another in this order, wherein the sheets were trued up on their respective one 18 cm-sides. The sheets were adhered using a two-pack urethane adhesive to obtain a laminate. The aluminum foil in the laminate was cut-out along the entire length of one 18 cm-side by a depth (in a direction perpendicular to the peripheral edge) of 10 mm as measured from the peripheral edge of the laminate. The laminate was folded in two about a central line perpendicularly traversing both 18 cm-sides thereof, thereby obtaining a folded laminate having a size of 9 cm×14 cm. With respect to each of three pairs of the opposite sides (i.e., a pair of opposite 9 cm-sides and two pairs of opposite 14 cm-sides) of the folded laminate, the opposite sides were melt-adhered to each other over a width of 10 mm from the peripheral edge thereof by heating at 180° C. for 8 seconds to thereby form a hermetic seal, thus providing a pouchy casing having an opening in the remaining pair of opposite 9 cm-sides and having terminal-withdrawal sites at the opening thereof.

An electrochemical cell prepared in substantially the same manner as in Example 1 was placed into the prepared pouchy casing and the terminals were taken out is of the opening of the pouchy casing through the terminal-withdrawal sites. The opening of the pouchy casing was hermetically sealed by heating at 180° C. for 8 seconds, thereby obtaining a battery. At the terminal-withdrawal sites of the pouchy casing, the width of the elongated, hermetic adhesion area was 20 mm from the peripheral edge of the pouchy casing. As mentioned above, the aluminum foil layer was cut-out along the entire length of 18 cm-side by a depth of 10 mm as measured from the peripheral edge of the pouchy casing. The depth of the cut-out portion was confirmed using a scale graduated in 1 millimeters.

Ten batteries were prepared as described above. The prepared batteries were subjected to charge/discharge cycle testing using a charge/discharge testing device (Model HJ-101SM6, manufactured and sold by Hokuto Denko Corporation, Japan). All of the ten batteries were capable of standard charge/discharge operation and their average discharge capacity was 900 mAh. None of the batteries charged at a constant voltage of 4.2 V suffered voltage-lowering and heat-generation caused by short-circuiting even when the terminal were folded. Further, no leakage of liquid was observed.

In addition, a pouchy casing was prepared in substantially the same manner as mentioned above, and 20 g of calcium chloride anhydride was sealed up inside the pouchy casing, instead of the electrochemical cell, in a width of 10 mm from the peripheral edge thereof by heating at 140° C. for 6 seconds. The sealed pouchy casing containing calcium chloride was placed at a temperature of 60° C. and a relative humidity (RH) of 90% for 3 months, but the increase in the weight of the pouchy casing was less than 1 mg.

EXAMPLE 6

A laminate for producing a pouchy casing for a battery was prepared in the following manner. Four different sheets respectively of a polyethylene terephthalate film (trade name: Melinex S, manufactured and sold by ICI Japan Ltd., Japan) having a length of 18 cm, a width of 14 cm and a thickness of 12 μm; an aluminum foil having a length of 18 cm, a width of 14 cm and a thickness of 9 μm; an aromatic polyamide film (trade name: Aramica, manufactured and sold by Asahi Kasei Kogyo Kabushiki Kaisha, Japan) having a length of 18 cm, a width of 14 cm and a thickness of 25 μm; and a polypropylene film (trade name: Taikoh FC, manufactured and sold by Futamura Chemical Industries Co., Ltd., Japan) having a length of 18 cm, a width of 14 cm and a thickness of 40 μm, were put one upon another in this order, in which the sheets: were adhered using a two-pack urethane adhesive to obtain a laminate. With respect to the aromatic polyamide film, the tension modulus and the compression modulus of the film were 1,500 kg/mm$^2$ and 200 kg/mm$^2$, respectively, as measured using a motor drive type universal testing machine (trade name: DSS-500, manufactured and sold by Shimadzu Corporation, Japan).

Figure 4:
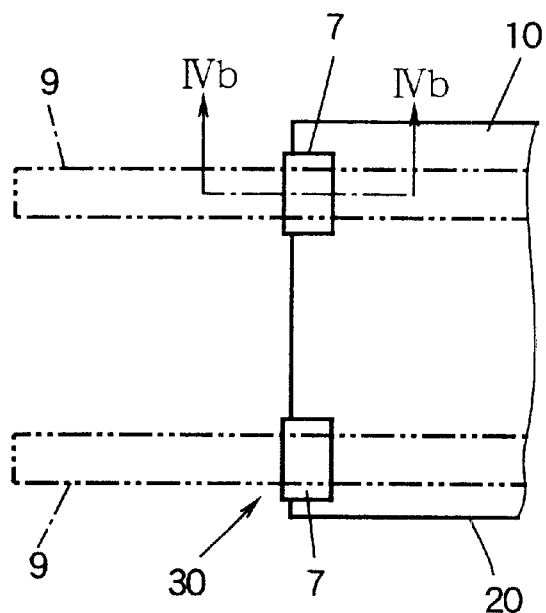
Figure 4:
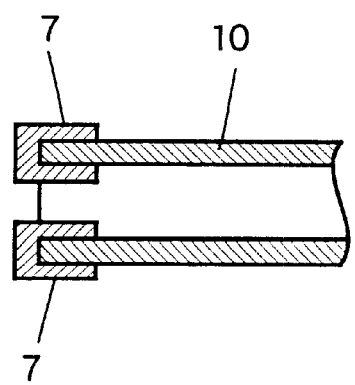

The laminate was folded in two about a central line perpendicularly traversing both 18 cm-sides thereof, thereby obtaining a folded laminate having a size of 9 cm×14 cm. With respect to each of two pairs of opposite sides (i.e., a pair of opposite 9 cm-sides and a pair of opposite 14 cm-sides) of the folded laminate, the opposite sides were melt-adhered to each other over a width of 10 mm from the peripheral edge thereof by heating at 180° C. for 6 seconds to thereby form a hermetic seal, thus providing a pouchy casing having an opening in the remaining pair of opposite 9 cm-sides and having terminal-withdrawal sites at the opening thereof. An electrochemical cell prepared in substantially the same manner as in Example 1 was placed into the prepared pouchy casing and the terminals were taken out of the opening of the pouchy casing through the terminal-withdrawal sites. The opening of the pouchy casing was hermetically sealed by heating at 180° C. for 6 seconds. Before sealing up the electrochemical cell in the pouchy casing, the surface of the edge of the opening of the pouchy casing was treated for electric insulation at portions thereof around the terminal-withdrawal sites. One surface of an aromatic polyamide film (trade name: Aramica, manufactured and sold by Asahi Kasei Kogyo Kabushiki Kaisha, Japan) (as an insulating material segment) having a length of 15 mm, a width of 5 mm and a thickness of 15 μm was coated with an epoxy resin adhesive (trade name: Cemedine EP-007, manufactured and sold by Cemedine Co., Ltd., Japan). The adhesive-coated aromatic polyamide film was folded in half with the adhesive-coated surface held inside, and, as shown in FIGS. 4(a) and 4(b), adhered to the edge of the opening of the pouchy casing at portions thereof around the terminal-withdrawal sites, so that one half of the film was adhered to the inner surface of the opening of the pouchy casing and the other half of the film was adhered to the outer surface of the opening of the pouchy casing, thereby electrically insulating the peripheral edge thereof. At the terminal-withdrawal sites of the pouchy casing, the width of the elongated, hermetic adhesion area was 10 mm from the peripheral edge of the pouchy casing, and the electrically insulating material segment was adhered so as to cover an area of a width (in a direction parallel to the peripheral edge) of 15 mm and a depth (in a direction perpendicular to the peripheral edge) of 2.5 mm.

Five batteries were prepared as described above. The prepared batteries were subjected to charge/discharge cycle testing using a charge/discharge testing device (Model HJ-101SM6, manufactured and sold by Hokuto Denko Corporation, Japan). All of the five batteries were capable of standard charge/discharge operation and their average discharge capacity was 900 mAh. None of the batteries charged at a constant voltage of 4.2 V suffered voltage-lowering or heat-generation caused by short-circuiting even when the terminals were folded. Further, no leakage of liquid was observed.

In addition, a pouchy casing was prepared in substantially the same manner as mentioned above, and 20 g of calcium chloride anhydride was sealed up inside the pouchy casing, instead of the electrochemical cell. The sealed pouchy casing containing calcium chloride was placed at a temperature of 60° C. and a relative humidity (RH) of 90° C. for 3 months, but the increase in the weight of the pouchy casing was less than 1 mg.

EXAMPLE 7

A laminate was prepared in the following manner. Four different sheets respectively of a polyethylene terephthalate film (trade name: Melinex S, manufactured and sold by ICI Japan Ltd., Japan) having a length of 18 cm, a width of 14 cm and a thickness of 12 $\mu$m; an aluminum foil having a length of 18 cm, a width of 14 cm and a thickness of 9 $\mu$m; a polyethylene terephthalate film (trade name: Melinex S, manufactured and sold by ICI Japan Ltd., Japan) having a length of 18 cm, a width of 14 cm and a thickness of 12 $\mu$m; and a polypropylene film (trade name: Taikoh FC, manufactured and sold by Futamura Chemical Industries Co., Ltd., Japan) having a length of 18 cm, a width of 14 cm and a thickness of 40 $\mu$m, were put one upon another in this order, in which the sheets were adhered using a two-pack urethane adhesive to obtain a laminate. With respect to the polyethylene terephthalate film, the tension modulus was 400 kg/mm$^2$, as measured using a motor drive type universal testing machine (trade name: DSS-500, manufactured and sold by Shimadzu Corporation, Japan).

The laminate was folded in two about a central line perpendicularly traversing both 18 cm-sides thereof, thereby obtaining a folded laminate having a size of 9 cm×14 cm. With respect to each of two pairs of opposite sides (i.e., a pair of opposite 9 cm-sides and a pair of opposite 14 cm-sides) of the folded laminate, the opposite sides were melt-adhered to each other over a width of 10 mm from the peripheral edge thereof by heating at 180° C. for 6 seconds to thereby form a hermetic seal, thus providing a pouchy casing having an opening in the remaining pair of opposite 9 cm-sides and having terminal-withdrawal sites at the opening thereof. The surface of the edge of the opening of the pouchy casing was treated for electric insulation at portions thereof around the terminal-withdrawal sites. A mixture of an amide-imide ester varnish (trade name: Nitron V-800, manufactured and sold by Nitto Denko Corp., Japan) and a hardner (No. 5 attached to the varnish) (as an electrically insulating material) was applied onto the surface of the edge of the opening of the pouchy casing around the terminal-withdrawal sites, and placed at 100° C. for 15 minutes, thereby electrically insulating the peripheral edge thereof. An electrochemical cell prepared in substantially the same manner as in Example 1 was placed into the prepared pouchy casing and the terminals were taken out of the opening of the pouchy casing through the terminal-withdrawal sites. The opening of the pouchy casing was hermetically sealed by heating at 180° C. for 6 seconds. At the terminal-withdrawal sites of the pouchy casing, the width of the elongated, hermetic adhesion area was 20 mm from the peripheral edge of the pouchy casing, and the entire length of the 18 cm-side of the pouchy casing was coated with the electrically insulating material by a depth (in a direction perpendicular to the peripheral edge of the pouchy casing) of 5 mm from the peripheral edge thereof.

Five batteries were prepared as described above. The prepared batteries were subjected to charge/discharge cycle testing using a charge/discharge testing device (Model HJ-101SM6, manufactured and sold by Hokuto Denko Corporation, Japan). All of the five batteries were capable of standard charge/discharge operation and their average discharge capacity was 900 mAh. None of the batteries charged at a constant voltage of 4.2 V suffered voltage-lowering and heat-generation caused by short-circuiting even when the terminals were folded. Further, no leakage of liquid was observed.

In addition, a pouchy casing was prepared in substantially the same manner as mentioned above, and 20 g of calcium chloride anhydride was sealed up inside the pouchy casing, instead of the electrochemical cell. The sealed pouchy casing containing calcium chloride was placed at a temperature of 60° C. and a relative humidity (RH) of 90% for 3 months, but the increase in the weight of the pouchy casing was less than 1 mg.

EXAMPLE 8

A laminate was prepared in the following manner. Four different sheets respectively of an aromatic polyamide film (trade name: Aramica, manufactured and sold by Asahi Kasei Kogyo Kabushiki Kaisha, Japan) having a length of 18 cm, a width of 14 cm and a thickness of 25 $\mu$m; an aluminum foil having a length of 18 cm, a width of 13 cm and a thickness of 25 $\mu$m; an aromatic polyamide film (trade name: Aramica, manufactured and sold by Asahi Kasei Kogyo Kabushiki Kaisha, Japan) having a length of 18 cm, a width of 14 cm and a thickness of 25 $\mu$m; and a polypropylene film (trade name: Taikoh FC, manufactured and sold by Futamura Chemical Industries Co., Ltd., Japan) having a length of 18 cm, a width of 14 cm and a thickness of 40 $\mu$m, were put one upon another in this order, wherein the sheets were trued up on their respective one 18 cm-sides. The sheets were adhered using a two-pack urethane adhesive to obtain a laminate. With respect to the aromatic polyamide film used in the laminate, the aromatic polyamide film exhibited no melting temperature as measured by DSC method. The aluminum foil in the laminate was deficient along the entire length of one 18 cm-side of the foil by a depth (in a direction perpendicular to the peripheral edge of the foil) of 10 mm from the peripheral edge of the laminate. The laminate was folded in two about a central line perpendicularly traversing both 18 cm-sides, thereby obtaining a folded laminate having a size of 9 cm×14 cm. With respect to each of two pairs of opposite sides (i.e., a pair of opposite 9 cm-sides free of a deficient portion and a pair of opposite 14 cm-sides) of the folded laminate, the opposite sides were melt-adhered to each other over a width of 10 mm from the peripheral edge thereof by heating at 180° C. for 6 seconds to thereby form a hermetic seal, thus providing a pouchy casing having an opening in the remaining pair of opposite 9 cm-sides and having terminal-withdrawal sites at the opening thereof. An electrochemical cell prepared in substantially the same manner as in Example 1 was placed into the prepared pouchy casing and the terminals were taken out of the opening of the pouchy casing through the terminal-withdrawal sites. The opening of the pouchy casing was hermetically sealed by heating at 180° C. for 6 seconds, thereby obtaining a battery. At the terminal-withdrawal sites of the pouchy casing, the width of the elongated, hermetic adhesion area was 20 mm from the peripheral edge of the pouchy casing. As mentioned above, the aluminum foil layer was cut-out along the entire length of the 18 cm-side of the foil by a depth of 10 mm as measured from the peripheral edge of the pouchy casing. The depth of the cut-out portion was confirmed using a scale graduated in 1 millimeters.

Five batteries were prepared as described above. All of the five batteries were capable of standard charge/discharge operation and their average discharge capacity was 900 mAh.

When a battery having a capacity of 910 mAh was charged at a constant voltage of 4.2 V and was placed in an oven (250° C.), gas effused from the adhesion area between the terminals and the laminate of the pouchy casing, but the laminate did not catch fire. In addition, when a battery having a capacity of 880 mAh was subjected to a charging operation at a constant current of 1.8 A, gas effusion was observed, but the laminate did not catch fire.

EXAMPLE 9

A laminate was prepared in the following manner. Four different sheets respectively of a polyphenylene sulfide film (trade name: Torelina, manufactured and sold by Toray Industries Inc., Japan) having a length of 18 cm, a width of 14 cm and a thickness of 25 $\mu$m; an aluminum foil having a length of 18 cm, a width of 14 cm and a thickness of 25 $\mu$m; a polyphenylene sulfide film having a length of 18 cm, a width of 14 cm and a thickness of 25 $\mu$m; and a polyethylene-vinyl alcohol copolymer film (trade name: Eval, manufactured and sold by Kuraray Co., Ltd., Japan) having a length of 18 cm, a width of 14 cm and a thickness of 20 $\mu$m, were put one upon another in this order, in which the sheets were adhered using a two-pack urethane.adhesive to obtain a laminate. The melting temperature of the polyphenylene sulfide film used in the laminate is 285° C. as measured by DSC method. The laminate was folded in two about a central line perpendicularly traversing both 18 cm-sides thereof, thereby obtaining a folded laminate having a size of 9 cm×14 cm. With respect to each of three pairs of opposite sides (i.e., a pair of opposite 9 cm-sides and two pairs of opposite 14 cm-sides) of the folded laminate, the opposite sides were melt-adhered to each other over a width of 10 mm from the peripheral edge thereof by heating at 180° C. for 6 seconds to thereby form a hermetic seal, thus providing a pouchy casing having an opening in the remaining pair of opposite 9 cm-sides and having terminal-withdrawal sites at the opening thereof. An electrochemical cell prepared in substantially the same manner as in Example 1 was placed into the prepared pouchy casing and the terminals were taken out of the opening of the pouchy casing through the terminal-withdrawal sites. The opening of the pouchy casing was hermetically sealed by heating at 180° C. for 6 seconds, thereby obtaining a battery. After sealing up the electrochemical cell in the pouchy casing, the surface of the edge of the opening of the pouchy casing was treated in the following manner for electrical insulation at portions thereof around the terminal withdrawal sites. A polyimide adhesive tape (Kapton adhesive tape manufactured and sold by Teraoka Seisakusho Co., Ltd., Japan) (as an electrically insulating material segment) was adhered to the edge of the opening of the pouchy casing at portions thereof around the terminal-withdrawal sites. At the terminal-withdrawal sites of the pouchy casing, the width of the elongated, hermetic adhesion area was 10 mm from the peripheral edge of the pouchy casing, and the electrically insulating material segment was adhered so as to cover an area of a width (in a direction parallel to the peripheral edge) of 40 mm and a depth (in a direction perpendicular to the peripheral edge) of 2.5 mm.

Ten batteries were prepared as described above. All of the ten batteries were capable of standard charge/discharge operation and their average discharge capacity was 900 mAh. None of the batteries charged at a constant voltage of 4.2 V suffered voltage-lowering and heat-generation caused by short-circuiting even when the terminals were folded. Further, no leakage of liquid was observed.

In addition, a pouchy casing was prepared in substantially the same manner as mentioned above, and 20 g of calcium chloride anhydride was sealed up inside the pouchy casing, instead of the electrochemical cell. The sealed pouchy casing containing calcium chloride was placed at a temperature of 60° C. and a relative humidity (RH) of 90% for 3 months, but the increase in the weight of the pouchy casing was less than 1 mg.

Further, when a battery having a capacity of 905 mAh was charged at a constant voltage of 4.2 V and was placed in an oven (250° C.), gas effused from the adhesion area between the terminals and the laminate of the pouchy casing, but the laminate did not catch fire. In addition, when a battery having a capacity of 850 mAh was subjected to a charging operation at a constant current of 1.8 A, gas effusion was observed, but the laminate did not catch fire.

EXAMPLE 10

A laminate was prepared in the following manner. Four different sheets respectively of a polyvinyl alcohol film (trade name: Kuraray Vinylon Film, manufactured and sold by Kuraray Co., Ltd., Japan) having a length of 18 cm, a width of 14 cm and a thickness of 25 $\mu$m; an aluminum foil having a length of 18 cm, a width of 13 cm and a thickness of 25 $\mu$m; a polyether ether ketone film (trade name: TALPA-2000, manufactured and sold by Mitsui Toatsu Chemical, Inc., Japan) having a length of 18 cm, a width of 14 cm and a thickness of 25 $\mu$m; and a polypropylene film (trade name: Taikoh FC, manufactured and sold by Futamura Chemical Industries Co., Ltd., Japan) having a length of 18 cm, a width of 14 cm and a thickness of 40 $\mu$m, were put one upon another in this order, wherein the sheets were trued up on their respective one 18 cm-sides. The sheets were adhered using a two-pack urethane adhesive to obtain a laminate. The melting temperature of the polyether ether ketone film and the polyvinyl alcohol film used in the laminate, as measured by DSC method, were respectively 334° C. and 230° C. The aluminum foil in the laminate was deficient along the entire length of one 18 cm-side of the foil by a depth (in a direction perpendicular to the peripheral edge of the foil) of 10 mm from the peripheral edge of the laminate. The laminate was folded in two about a central line perpendicularly traversing both 18 cm-sides thereof, thereby obtaining a folded laminate having a size of 9 cm×14 cm. With respect to each of three pairs of opposite sides (i.e., a pair of opposite 9 cm-sides free of a deficient portion and two pairs of opposite 14 cm-sides) of the folded laminate, the opposite sides were melt-adhered to each other over a width of 10 mm from the peripheral edge thereof by heating at 180° C. for 6 seconds to thereby form a hermetic seal, thus providing a pouchy casing having an opening in the remaining pair of opposite 9 cm-sides and having terminal-withdrawal sites at the opening thereof. An electrochemical cell prepared in substantially the same manner as in Example 1 was placed into the prepared pouchy casing and the terminals were taken out of the opening of the pouchy casing through the terminal-withdrawal sites. The opening of the pouchy casing was hermetically sealed by heating at 180° C. for 6 seconds, thereby obtaining a battery. At the terminal-withdrawal sites of the pouchy casing, the width of the elongated, hermetic adhesion area was 20 mm from the peripheral edge of the pouchy casing. As mentioned above, the aluminum foil layer was cut-out along the entire length of the 18 cm-side of the foil by a depth of 10 mm as measured from the peripheral edge of the pouchy casing. The depth of the cut-out portion was confirmed using a scale graduated in 1 millimeters.

Five batteries were prepared as described above. All of the five batteries were capable of standard charge/discharge operation and their average discharge capacity was 900 mAh. None of the batteries charged at a constant voltage of 4.2 V suffered voltage-lowering and heat-generation caused by short-circuiting even when the terminals were folded. Further, no leakage of liquid was observed.

In addition, a pouchy casing was prepared in substantially the same manner as mentioned above, and 20 g of calcium chloride anhydride was sealed up inside the pouchy casing, instead of the electrochemical cell. The sealed pouchy casing containing calcium chloride was placed at a temperature of 60° C. and a relative humidity (RH) of 90% for 3 months, but the increase in the weight of the pouchy casing was less than 1 mg.

Further, when a battery having a capacity of 905 mAh was charged at a constant voltage of 4.2 V and was placed in an oven (250° C.), gas effused from the adhesion area between the terminals and the laminate of the pouchy casing, but the laminate did not catch fire.

EXAMPLE 11

A battery was prepared in substantially the same manner as mentioned in Example 8, except that a laminate for producing the pouchy casing was prepared in the following manner. Four different sheets respectively of a polyimide film (trade name: Kapton, manufactured and sold by Du Pont-Toray Co., Ltd., Japan) having a length of 18 cm, a width of 14 cm and a thickness of 12.5 $\mu$m; an aluminum foil having a length of 18 cm, a width of 13 cm and a thickness of 20 $\mu$m; a polyphenylene sulfide film having a length of 18 cm, a width of 14 cm and a thickness 25 $\mu$m; and a polypropylene film (trade name: Taikoh FC, manufactured and sold by Futamura Chemical Industries Co., Ltd., Japan) having a length of 18 cm, a width of 14 cm and a thickness of 60 $\mu$m, were put one upon another in this order, wherein the sheets were trued up on their respective one 18 cm-sides. The sheets were adhered using a two-pack urethane adhesive to obtain a laminate. (With respect to the polyimide film used in the laminate, the polyimide film exhibited no melting temperature as measured by DSC method.)

The prepared battery exhibited excellent properties which were equivalent to those of the battery prepared in Example 8.

EXAMPLE 12

The positive electrode sheet (having the positive electrode layer on one side thereof) prepared in the same manner as mentioned in Example 1 was fabricated so as to have a size of 6 cm×50 cm. The negative electrode sheet (having the negative electrode layer on one side thereof) prepared in the same manner as mentioned in Example 1 was fabricated so as to have a size of 6.5 cm×51 cm. A polyethylene separator (trade name: Hipore U-2, manufactured and sold by Asahi Kasei Kogyo Kabushiki Kaisha, Japan) was fabricated so as to have a size of 7 cm×54 cm. Then, the obtained positive electrode sheet, the separator and the negative electrode sheet were laminated so that the separator was interposed between the two types of electrode sheets, and the positive electrode layer of the positive electrode sheet and the negative electrode layer of the negative electrode sheet were opposite to each other through the separator, thereby obtaining a positive electrode/separator/negative electrode laminate. The obtained positive electrode/separator/negative electrode laminate was immersed in a non-aqueous electrolytic solution obtained by dissolving lithium tetrafluoroborate (LiBF$_4$) in a mixed solution of ethylene carbonate (EC), propylene carbonate (PC) and γ-butyrolactone (γ-BL) (EC/PC/γ-BL weight ratio=1:1:2, and LiBF$_4$ concentration: 1.5 mol/liter) to thereby impregnate the separator with the electrolytic solution. An roughened aluminum foil having a length of 10 cm, a width of 1 cm, and a thickness of 50 $\mu$m (Ra=0.4 $\mu$m and TIR=2.8 $\mu$m) as a positive terminal, and a roughened copper foil having a length of 10 cm, a width of 1 cm and a thickness of 35 $\mu$m (Ra=1.2 $\mu$m and TIR=6.5 $\mu$m) as a negative terminal were respectively connected to the current collectors of the positive and negative electrode sheets (which are both outermost layers of the positive electrode/separator/negative electrode laminate) by means of an ultrasonic metal welder. The terminals were, respectively, connected to the current collectors so that one end of the width of the terminal was positioned at a distance of 1 cm from one end of the width of the electrode sheet. Next, the positive electrode/separator/negative electrode laminate with the terminals were accordion folded at intervals so as to have five folds, thereby obtaining an electrochemical cell.

Using the above-obtained electrochemical cell and a laminate prepared in substantially the same manner as mentioned in Example 5, a battery was prepared in substantially the same manner as mentioned in Example 5.

No leakage of liquid was observed in the above-prepared battery. The prepared battery was subjected to charge/discharge cycle testing using a charge/discharge testing device (Model HJ-101SM6, manufactured and sold by Hokuto Denko Corporation, Japan). The battery was capable of standard charge/discharge operation and their average discharge capacity was 900 mAh.

In addition, no leakage of liquid was observed from the hermetic seal of the pouchy casing even when the battery was placed at a temperature of 95° C. for 48 hours or at room temperature for 1 month or more.

EXAMPLE 13

A laminate (14 cm×18 cm) for producing a pouchy casing for a battery was prepared in substantially the same manner as mentioned in Example 11. In the laminate, the aluminum foil was cut-out along the entire length of one 18 cm-side of the foil by a depth (in a direction perpendicular to the peripheral edge of the foil) of 10 mm as measured from the peripheral edge of the laminate. The laminate was folded in two about a central line perpendicularly traversing both 18 cm-sides thereof, thereby obtaining a folded laminate having a size of 9 cm×14 cm. With respect to each of three pairs of opposite sides (i.e., a pair of opposite 9 cm-sides free of a cut-out portion and two pairs of opposite 14 cm-sides) of the folded laminate, the opposite sides were melt-adhered to each other over a width of 10 mm from the peripheral edge thereof by heating at 180° C. for 6 seconds to thereby form a hermetic seal, thus providing a pouchy casing having an opening in the remaining pair of opposite 9 cm-sides and having terminal-withdrawal sites in the peripheral edge of the opening thereof. Prior to the melt adhesion, an elongated SUS foil having a length of 15 mm, a width of 5 mm and a thickness of 10 $\mu$m was interposed between the opposing sides of the laminate (i.e., the polypropylene film layers), so that, after the opposite inner thermoplastic layers were melt-adhered to each other at an elongated, hermetic adhesion area, the elongated SUS foil penetrated through and across the elongated, hermetic adhesion area, wherein both ends of the elongated SUS foil were outside of both sides of the elongated, hermetic adhesion area. Thus, a safety valve was provided. An electrochemical cell was prepared in substantially the same manner as in Example 1 except that the terminals were prepared as follows. For preparing a positive terminal, a roughened aluminum foil (Ra 0.4 $\mu$m and TIR=2.8 $\mu$m) having a thickness of 50 $\mu$m was fabricated into a piece having a length of 3 cm and a width of 10 mm, and another piece having a length of 8 cm and a width of 10 mm. The above-mentioned two aluminum pieces were arranged so as to overlap at their respective one end portions over lengths of 1 cm, and the overlapping portions were adhered using an electrically conductive adhesive double-coated tape (trade name: WMFT, manufactured and sold by Teraoka Seisakusho Co., Ltd.,.Japan) having a size of 1 cm×1 cm. Then, the adhered portion of the aluminum pieces was heat-pressed at 185° C. for 5 seconds to thereby obtain an aluminum terminal having a length of 10 cm (the resistance between both ends of the terminal was 10 m$\Omega$). The obtained aluminum terminal was used as a positive terminal. As a negative terminal, a roughened copper foil (Ra=1.2 $\mu$m and TIR=6.5 $\mu$m) having a length of 10 cm, a width of 1 cm and a thickness of 35 $\mu$m was used. Both terminals were, respectively, connected to the current collectors of the positive and negative electrode sheets, which were both outermost layers of the positive electrode/electrolyte/negative electrode laminate, by means of an ultrasonic metal welder (trade name: SW-200Z38S, manufactured and sold by Ultrasonic Engineering Co., Ltd. Japan), wherein the weld-connection of the terminals to the current collectors was effected over a length of 1 cm from the respective edges of the current collectors. The thus obtained electrochemical cell was placed into the pouchy casing prepared above and the terminals were taken out of the opening of the pouchy casing through the terminal-withdrawal sites. The opening of the pouchy casing was hermetically sealed by heating at 180° C. for 6 seconds, thereby preparing a battery.

Five batteries were prepared as described above. At the terminal-withdrawal sites of the pouchy casing, the width of the hermetic adhesion area was 20 mm from the peripheral edge of the pouchy casing, and the aluminum foil layer was cut-out along the entire length of the peripheral edge of the foil by a depth of 10 mm as measured from the peripheral edge of the pouchy casing. The depth of the cut-out portion was confirmed under an optical microscope (System Metal Microscope BHT, manufactured and sold by Olympus Optical Co., Ltd., Japan) using an objective micrometer graduated in 0.01 millimeters (manufactured and sold by Olympus Optical Co., Ltd., Japan). Due to the weak adhesion between the elongated SUS foil and the polypropylene film, the elongated SUS foil interposed between the opposing sides of the laminate was capable of functioning as a safety valve for the battery. The prepared batteries were subjected to charge/discharge cycle testing using a charge/discharge testing device (Model HJ-101SM6, manufactured and sold by Hokuto Denko Corporation, Japan). All of the five batteries were capable of standard charge/discharge operation and their average discharge capacity was 900 mAh. The battery was subjected to a charging operation at a constant capacity of 900 mA, and even after 3 hours of charging operation, the expansion of the battery was small and the thickness of the battery became only 1.5 times that of the battery before subjecting to the charging operation. In addition, the battery did not suffer bursting and catch fire.

EXAMPLE 14

A laminate (14 cm×18 cm) for producing a pouchy casing for a battery was prepared in substantially the same manner as mentioned in Example 5.

A copper foil (as a terminal) having a width of 1 cm, a length of 4 cm and a thickness of 35 $\mu$m was prepared, and the surface thereof was roughened (Ra=1.2 $\mu$m and TIR=6.5 $\mu$m). The roughened copper foil (as a negative terminal for the below-mentioned pouchy casing). was placed on the polypropylene film layer (inner thermoplastic resin layer) of the laminate on the 18 cm-side of the laminate at a portion which is 2 cm distant from the central line (folding line) perpendicularly traversing both 18 cm-sides of the laminate, and a portion of the copper foil which was 2.5 cm from the inner edge of the copper foil was adhered, by resin melting, to the polypropylene film of the laminate by heating at 180° C. for 6 seconds, and the remaining 1.5 cm portion of the copper foil protruded from the peripheral edge of the laminate. Then, a polyimide adhsive tape (Kapton adhesive tape manufactured and sold by Teraoka Seisakusyo Co., Ltd., Japan) having a width of 1 cm was adhered onto the inner thermoplastic resin layer of the laminate along the entire length of the 18 cm-side so that the outer edge of the tape was parallel to and was positioned at a distance 1.5 cm from the peripheral edge of the laminate. A portion of the adhered tape which was overlapping the copper foil terminal and both end portions (1 cm-long) of the adhered tape were removed from the inner thermoplastic resin layer of the laminate.

An electrochemical cell was prepared in substantially the same manner as mentioned in Example 1 except that a roughened copper foil (Ra=1.2 $\mu$m, TIR=6.5 $\mu$m) was used as a negative terminal. A part of the negative terminal connected to the negative current collector of the electrochemical cell was cut-away so that the length of the negative terminal protruding outside of the electrochemical cell was 1.5 cm. The resultant electrochemical cell was placed on the inner thermoplastic resin layer of the laminate so as for the negative terminal of the electrochemical cell to partially overlap the above-mentioned copper negative terminal (for the pouchy casing) attached onto the inner thermoplastic resin layer of the laminate, wherein the forward end portion of the former (terminal) overlapped the rear end portion of the latter (terminal) over a length of 1 cm. The negative terminal of the electrochemical cell and the copper terminal for the below-mentioned mentioned pouchy casing were connected by means of an ultrasonic metal welder (USW-200Z38S, manufactured and sold by Ultrasonic Engineering Co., Ltd., Japan) by applying a load of 3 kg for 0.1 seconds to the overlapping portion thereof at an area of 2.5 mm×5 mm. The resultant laminate was folded in two about the central line perpendicularly traversing both 18 cm-sides thereof, thereby obtaining a folded laminate having a size of 9 cm×14 cm so as to enclose the electrochemical cell therein. With respect to each of the three pairs of opposite sides (i.e., a pair of opposite 9 cm-sides without the terminals and two pairs of opposite 14 cm-sides), the opposite sides were melt-adhered to each other over a width of 10 mm from the peripheral edge of the laminate by heating at 180° C. for 6 seconds to form a hermetic seal, thereby forming a pouchy casing containing the electrochemical cell. With respect to the remaining 9 cm-side with the terminals (including the copper negative terminal for the pouchy casing and the positive terminal) protruding therefrom, the pair of opposite sides were melt-adhered to each other over a width of 25 mm from the peripheral edge of the laminate by heating at 180° C. for 6 seconds to thereby form a hermetic seal. As a result, the electrochemical cell was sealed up inside the pouchy casing to obtain a battery.

Five batteries were prepared in the same manner as described above. In the obtained battery, the Kapton adhesive tape and the polypropylene layer of the laminate were not melt-adhered to each other. The negative terminal protruding from the electrochemical cell was adhered to one of the inner surfaces of the pouchy casing by resin melting, while the copper terminal protruding from the pouchy casing was adhered, by resin melting, to the other inner surface of the pouchy casing which was opposing the inner surface to which the negative terminal of the electrochemical cell was adhered by resin melting. The prepared batteries were subjected to charge/discharge cycle testing using a charge/discharge testing device (Model HJ-101SM6, manufactured and sold by Hokuto Denko Corporation, Japan).

All of the five batteries were capable of standard charge/discharge operation and their average discharge capacity was 900 mAh. The battery was subjected to charging operation at a constant current of 900 mA, and 2.5 hours after the start of the charging operation, the pouchy casing was caused to expand to a thickness of twice that of the battery before subjecting the battery to the charging operation, and the ultrasonic weld-connection between the negative terminal and the copper terminal was broken. Consequently, the electric current was cut-off and the battery was no longer. charged. In addition, the battery did not suffer bursting and catch fire.

Comparative Example 1

A laminate was prepared in the following manner. Four different sheets respectively of a polyethylene terephthalate film (trade name: Melinex S, manufactured and sold by ICI Japan Ltd., Japan) (as an outer electrically insulating material layer) having a length of 18 cm, a width of 14 cm and a thickness of 12 $\mu$m; an aluminum foil (as a middle metal foil layer) having a length of 18 cm, a width of 14 cm and a thickness of 9 $\mu$m; a polyethylene terephthalate film (trade name: Melinex S, manufactured and sold by ICI Japan Ltd., Japan) (as an intermediate electrically insulating material layer) having a length of 18 cm, a width of 14 cm and a thickness of 12 $\mu$m; and a polypropylene film (trade name: Taikoh FC,. manufactured and sold by Futamura Chemical Industries Co., Ltd., Japan) (as an inner thermoplastic resin layer) having a length of 18 cm, a width of 14 cm and a thickness of 40 $\mu$m, were put one upon another in this order, in which the sheets were adhered using a two-pack urethane adhesive to obtain a laminate. In the obtained laminate, the aluminum foil layer was exposed at the peripheral edge thereof. The laminate was folded in two about a central line perpendicularly traversing both 18 cm-sides thereof, thereby obtaining a folded laminate having a size of 9 cm×14 cm. With respect to each of three pairs of opposite sides (i.e., a pair of opposite 9 cm-sides and two pairs of opposite 14 cm-sides) of the folded laminate, the opposite sides were melt-adhered to each other over a width of 10 mm from the peripheral edge of the laminate by heating.at 180° C. for 6 seconds to thereby form a hermetic seal, thus providing a pouchy casing having an opening in the remaining pair of opposite 9 cm-sides and having terminal-withdrawal sites at the opening thereof. The peripheral portion of the opening of the pouchy casing was cut-away by a depth (in a direction perpendicular to the peripheral edge thereof) of 1 mm to thereby true up the edges of all four layers (i.e., the thermoplastic resin layer, the metal foil layer, and the electrically insulating material layers) of the laminate. An electrochemical cell prepared in substantially the same manner as in Example 1 was placed into the prepared pouchy casing and the terminals were taken out of the opening of the pouchy casing through the terminal-withdrawal sites. The opening of the pouchy casing was hermetically sealed by heating at 180° C. for 6 seconds, thereby obtaining a battery.

Five batteries were prepared in the same manner as described above. At the terminal-withdrawal sites of the pouchy casing, the width of the elongated, hermetic adhesion area was 20 mm from the peripheral edge of the pouchy casing. When the boundary between the terminals and the pouchy casing was observed under an optical microscope (System Metal Microscope BHT, manufactured and sold by Olympus Optical Co., Ltd., Japan) using an objective micrometer graduated in 0.01 millimeters (manufactured and sold by Olympus Optical Co., Ltd., Japan), it was found that the polypropylene resin was melt-protruding from the peripheral edge of the pouchy casing at a width of 0.05 mm.

The prepared batteries were subjected to charge/discharge cycle testing using a charge/discharge testing device (Model HJ-101 SM6, manufactured and sold by Hokuto Denko Corporation, Japan) while paying special care not to fold the terminals. All of the five batteries were capable of standard charge/discharge operation, but the batteries charged at a constant voltage of 4.2 V suffered voltage-lowering and heat-generation caused by short-circuiting when the terminals were folded. The resistance between the folded terminals was 2 M$\Omega$.

In addition, a pouchy casing was prepared in substantially the same manner as mentioned above, and 20 g of calcium chloride anhydride was sealed up inside the pouchy casing, instead of the electrochemical cell. The sealed pouchy casing containing calcium chloride was placed at a temperature of 60° C. and a relative humidity (RH) of 90% for 3 months, but the increase in the weight of the pouchy casing was less than 1 mg.

Comparative Example 2

A laminate was prepared in the following manner. Four different sheets respectively of a polyethylene terephthalate film (trade name: Melinex S, manufactured and sold by ICI Japan Ltd., Japan) (as an outer electrically insulating material layer) having a length of 18 cm, a width of 14 cm and a thickness of 25 $\mu$m; an aluminum foil (as a middle metal foil layer) having a length of 18 cm, a width of 14 cm and a thickness of 12 $\mu$m; a stretched nylon film (trade name: Unilon, manufactured and sold by Idemitsu Petrochemical Co., Ltd., Japan) (as an intermediate electrically insulating material layer) having a length of 18 cm, a width of 14 cm and a thickness of 15 $\mu$m; and an L-LDPE film (trade name: LS-700C, manufactured and sold by Idemitsu Petrochemical Co., Ltd., Japan) (as an inner thermoplastic resin layer) having a length of 18 cm, a width of 13 cm and a thickness of 50 $\mu$m, were put one upon another in this order, in which the sheets were adhered using a two-pack urethane adhesive to obtain a laminate. In the obtained laminate, the aluminum foil layer was exposed at the peripheral edge thereof. The laminate was folded in two about a central line perpendicularly traversing both 18 cm-sides thereof, thereby obtaining a folded laminate having a size of 9 cm×14 cm. With respect to each of three pairs of opposite sides (i.e., a pair of opposite 9 cm-sides and two pairs of opposite 14 cm-sides) of the folded laminate, the opposite sides were melt-adhered to each other over a width of 10 mm from the peripheral edge thereof by heating at 140° C. for 6 seconds to thereby form a hermetic seal, thus providing a pouchy casing having an opening in the remaining pair of opposite 9 cm-sides and having terminal-withdrawal sites at the opening thereof. The peripheral portion of the opening of the pouchy casing was cut-away by a depth (in a direction perpendicular to the peripheral edge thereof) of 1 mm to thereby true up the edges of all four layers (i.e., the thermoplastic resin layer, the metal foil layer, and the electrically insulating material layers) of the laminate. An electrochemical cell prepared in substantially the same manner as in Example 1 was placed into the prepared pouchy casing and the terminals were taken out of the opening of the pouchy casing through the terminal-withdrawal sites. The opening of the pouchy casing was hermetically sealed by heating at 120° C. for 6 seconds, thereby obtaining a battery. At the terminal-withdrawal sites of the pouchy casing, the width of the elongated, hermetic adhesion area was 20 mm from the peripheral edge of the pouchy casing.

Five batteries were prepared in the same manner as described above. When the peripheral edge of the battery at a portion thereof from which the terminal protruded was observed under an optical microscope (System Metal Microscope BHT, manufactured and sold by Olympus Optical Co., Ltd., Japan) using an objective micrometer graduated in 0.01 millimeters (manufactured and sold by Olympus Optical Co., Ltd., Japan), it was found that the L-LDPE resin was melt-protruding from the peripheral edge of the pouchy casing at a width of 0.07 mm.

The prepared batteries were subjected to charge/discharge cycle testing using a charge/discharge testing device (Model HJ-101SM6, manufactured and sold by Hokuto Denko Corporation, Japan) while paying special care not to fold the terminals. All of the five batteries were capable of standard charge/discharge operation, but the batteries charged at a constant voltage of 4.2 V suffered voltage-lowering and heat-generation caused by short-circuiting when the terminals were folded. The resistance between the folded terminals was 100 MΩ.

In addition, a pouchy casing was prepared in substantially the same manner as mentioned above, and 20 g of calcium chloride anhydride was sealed up inside the pouchy casing, instead of the electrochemical cell. The sealed pouchy casing containing calcium chloride was placed at a temperature of 60° C. and a relative humidity (RH) of 90% for 3 months, but the increase in the weight of the pouchy casing was less than 1 mg.

Comparative Example 3

A laminate was prepared in the following manner. Four different sheets respectively of a polyethylene terephthalate film (trade name: Melinex S, manufactured and sold by ICI Japan Ltd., Japan) (as an outer electrically insulating material layer) having a length of 18 cm, a width of 14 cm and a thickness of 12 μm; an aluminum foil (as a middle metal foil layer) having a length of 18 cm, a width of 11.8 cm and a thickness of 9 μm; a polyethylene terephthalate film (trade name: Melinex S, manufactured and sold by ICI Japan Ltd., Japan) (as an intermediate electrically insulating material layer) having a length of 18 cm, a width of 14 cm and a thickness of 12 μm; and a polypropylene film (trade name: Taikoh FC, manufactured and sold by Futamura Chemical Industries Co., Ltd., Japan) (as an inner thermoplastic resin layer) having a length of 18 cm, a width of 14 cm and a thickness of 40 μm, were put one upon another in this order, wherein the sheets were trued up on their respective one 18 cm-sides. The sheets were adhered using a two-pack urethane adhesive to obtain a laminate. The aluminum foil was cut-out along the entire length of one 18 cm-side of the foil by a depth (in a direction perpendicular to the peripheral edge of the foil) of 22 mm as measured from the peripheral edge of the laminate. The laminate was folded in two about a central line perpendicularly traversing both 18 cm-sides thereof, thereby obtaining a folded laminate having a size of 9 cm×14 cm. With respect to each of three pairs of opposite sides (i.e., a pair of opposite 9 cm-sides free of a cut-out portion and two pairs of opposite 14 cm-sides) of the folded laminate, the opposite sides were melt-adhered to each other over a width of 10 mm from the peripheral edge thereof by heating at 180° C. for 6 seconds to thereby form a hermetic seal, thus providing a pouchy casing having an opening in the remaining pair of opposite 9 cm-sides and having terminal-withdrawal sites at the. opening thereof.

20 g of calcium chloride anhydride was sealed up inside the pouchy casing by hermetically sealing the opening of the pouchy casing. At a portion of the pouchy casing which corresponds to the terminal-withdrawal sites, the width of the elongated, hermetic adhesion area was 20 mm from the peripheral edge of the pouchy casing. As mentioned above, the aluminum foil layer was cut-out along the entire length of one 9 cm-side of the pouchy casing by a depth of 22 mm (thus, the depth of the cut-out portion was larger than the depth of the elongated, hermetic adhesion area). The depth of the cut-out portion was confirmed under an optical microscope (System Metal Microscope BHT, manufactured and sold by Olympus Optical Co., Ltd., Japan) using an objective micrometer graduated in 0.01 millimeters (manufactured and sold by Olympus Optical Co., Ltd., Japan). The sealed pouchy casing containing calcium chloride was placed at a temperature of 60° C. and a relative humidity (RH) of 90% for 3 months. As a result, the weight of the pouchy casing increased by 640 mg.

An electrochemical cell prepared in substantially the same manner as in Example 1 was placed into a pouchy casing prepared as described above, and the terminals were taken out of the opening of the pouchy casing through the terminal-withdrawal sites. The opening of the pouchy casing was hermetically sealed, thereby obtaining a battery having a capacity of 900 mAh. When the charged battery having a voltage of 4.2 V was allowed to stand under ambient conditions for 3 months, the capacity of the battery decreased to 80% of that of the battery obtained in Example 5.

EXAMPLE 15

A powder of lithium cobalt oxide ($LiCoO_2$; average particle diameter: 5 μm) and acetylene black were added to and dispersed in a solution of polyvinylidene fluoride (as a binder) in N-methylpyrrolidone (NMP), so that a mixture containing solid components in the following dry weight ratio was obtained: $LiCoO_2$ (100 parts), acetylene black (3 parts) and polyvinylidene fluoride (3 parts). The obtained mixture was applied onto an aluminum sheet (thickness: 15 μm) (as a current collector) and dried, followed by heat-pressing, to thereby prepare a positive electrode layer having a thickness of 110 μm. The aluminum sheet having the prepared positive electrode layer thereon was used as a positive electrode sheet. The positive electrode sheet was fabricated so as to have a width of 29 mm and a length of 110 mm. The positive electrode layer on the positive electrode sheet was partly removed along the entire length of the 29 mm-side by a width of 10 mm to thereby expose the aluminum current collector. The resultant positive electrode sheet had an elongated, aluminum current collector portion extending along the side of the positive electrode sheet.

A powder of graphite (trade name: Graphite MCMB, manufactured and sold by Osaka Gas Co., Ltd.) having an average particle diameter of 10 μm was homogeneously mixed with an aqueous solution of styrene-butadiene latex and carboxymethyl cellulose, so that a slurry containing solid components in the following dry weight ratio was obtained: graphite (100 parts), styrenebutadiene latex (2 parts) and carboxymethyl cellulose (0.8 part). The obtained slurry was applied onto a copper sheet (thickness: 12 μm) (as a current collector) and dried, followed by heat-pressing, to thereby prepare a negative electrode layer having a thickness of 85 μm. The copper sheet having the prepared negative electrode layer thereon was used as a negative electrode sheet. The negative electrode sheet was fabricated so as to have a width of 30 mm and a length of 110 mm. The negative electrode layer on the negative electrode sheet was partly removed along the entire length of the 30 mm-side by a width of 9 mm to thereby expose the copper current collector. The resultant negative electrode sheet had an elongated, copper current collector portion extending along the side of the negative electrode sheet.

A sheet of hexafluoropropylene/vinylidene fluoride copolymer resin (thickness: 50 μm) (hexafluoropropylene content: 3% by weight) (trade name: Kynar 2850, manufactured and sold by Elf Atochem North America Inc., USA) was irradiated with electron beams (irradiation dose: 10 Mrads) to thereby obtain a crosslinked sheet, and subsequently, the crosslinked sheet was immersed in a mixture of flon HFC134a and water, thereby obtaining an impregnated sheet (liquid content: 7 parts by weight). The impregnated sheet was stretched while heating. As a result, a porous sheet having a thickness of 60 μm (expansion ratio: 4 times) was obtained. The obtained porous sheet was immersed in a non-aqueous electrolytic solution obtained by dissolving lithium tetrafluoroborate ($LiBF_4$) in a mixed solution of ethylene carbonate (EC) and γ-butyrolactone (γ-BL) (EC/γ-BL weight ratio=1:1, and $LiBF_4$ concentration: 1.5 mol/liter) to thereby impregnate the porous sheet with the electrolytic solution. The impregnated porous sheet having a large length had an electrolytic solution content of 75% by weight, an average thickness of 65 μm and a width of 102 mm. This sheet was fabricated into sheets each having a width of 32 mm and a length of 102 mm, thereby obtaining a separator.

The positive and negative electrode sheets were coated with the above-mentioned electrolytic solution using a roll coater, in which the amounts of electrolytic solution coated were 30 g/m$^2$ and 40 g/m$^2$, respectively. Then, the positive electrode sheet, the separator and the negative electrode sheet were put one upon another in this order so that the positive electrode layer of the positive electrode sheet was opposite to the negative electrode layer of the negative electrode sheet through the separator which was disposed therebetween, thereby obtaining a flat triple-layer electrode structure, which had the above-mentioned positive and negative current collector portions laterally projecting from both sides of the flat electrode structure in opposite directions like wings. The flat electrode structure was heat-pressed by means of a heat roller (rolling temperature: 130° C., rolling rate: 600 mm/min.), thereby obtaining a flat electrode assembly having a positive electrode/separator/negative electrode laminate structure. Eight flat electrode assemblies were prepared in the same manner as described above. The prepared eight flat electrode assemblies were put one upon another so that the respective positive and negative electrodes of the flat electrode assemblies were arranged in such a manner as represented by "positive electrode/negative electrode/negative electrode/positive electrode/ positive electrode/negative electrode/ . . . ". In the resultant flat electrochemical cell structure, all of the aluminum current collector portions were stacked one upon another and projected from one side of the flat electrochemical cell structure, whereas the copper current collector portions were stacked one upon another and projected from the other side of the flat electrochemical cell structure. The stacked aluminum current collector portions were connected together using an ultrasonic metal welder. The weld-connection of the stacked aluminum current collector portions was effected in an area of 3 mm×3 mm positioned at the middle portion of the longitudinal axis of the current collector portions. With respect to the copper current collector portions also, the weld-connection of them were conducted in the same manner as mentioned above.

An aluminum foil (as a positive terminal) having a width of 10 mm, a length of 30 mm and a thickness of 30 μm, and a copper foil (as a negative terminal) having a width of 10 mm, a length of 30 mm and a thickness of 30 μm were, respectively, connected to the current collector portions of the positive and negative electrode sheets at the above-mentioned areas (3 mm×3 mm) thereof by means of an ultrasonic metal welder, thereby obtaining an electrochemical cell in a complete form, wherein the terminals protrude outwardly from both sides of the electrochemical cell in opposite directions.

A laminate prepared by putting three sheets (namely, a polyethylene terephthalate film having a thickness of 25 μm, an aluminum foil having a thickness of 12 μm, and a polypropylene film having a thickness of 50 μm) one upon another in this order was used for producing a pouchy casing for a battery.

A pouchy casing was prepared using the above-mentioned laminate. The pouchy casing had two openings respectively at the opposite sides, that is at the top and the bottom of the pouchy casing. The electrochemical cell prepared above was placed into the prepared pouchy casing and the terminals (protruding in opposite directions) were, respectively, taken out from both openings at the top and bottom of the casing through the terminal-withdrawal sites. One surface of the aluminum terminal was adhered to one of the two opposing inner surfaces (which are made of the inner polypropylene film layer of the laminate) of the pouchy casing by resin melting, and one surface of the copper terminal which was opposing the other inner surface of the pouchy casing was adhered thereto by resin melting. Both openings of the pouchy casing were hermetically sealed under vacuum, thereby obtaining a battery. Before sealing up the electrochemical cell in the pouchy casing, the surface of the edges of the openings of the pouchy casing were treated for electric insulation at portions thereof around the terminal-withdrawal sites in substantially the same manner as mentioned in Example 7 by using an amide-imide ester varnish and a hardner. At the terminal-withdrawal sites of the pouchy casing, the width of the hermetic adhesion area was 3 mm from the peripheral edge of the pouchy casing.

The terminals of the battery were connected to a charge/discharge testing device, and the battery was subjected to charge/discharge cycle testing at a current density of 230 mA/cm$^2$. The charging operation was conducted at a constant voltage of 4.2 V. The amount of current discharged at the first cycle was 730 mAh and the average voltage between the electrodes was 3.7 V (2.7 Wh). These results show that this battery is capable of being repeatedly charged and discharged.

Further, during the charging operation of the battery, a thermoelectric couple was attached to the surface of the battery at the central portion of the pouchy casing and at the portion of the hermetic seal where the terminals were adhered to the pouchy casing by resin melting. The terminals of the battery were connected to the charge/discharge testing device and the battery was overcharged at a current of 2880 mA and a constant voltage of 15 V. Approximately 19 minutes after the start of the charging operation, the pouchy casing began to expand and, after the next 15 seconds, the ultrasonic weld-connections between the terminals and the electrochemical cell were broken, thereby breaking the electric current. As a consequence, the temperature of the battery began to lower, and the maximum temperatures at the portions around the terminals and at the center of the pouchy casing were only 38° C. and 42° C., respectively.

INDUSTRIAL APPLICABILITY

The non-aqueous battery of the present invention having a thin configuration is advantageous not only in that it is light in weight, thin and flexible, but also in that it has an excellent moisture resistance and an excellent air tightness and is free from the danger of the occurrence of a short-circuiting at portions around the terminal-withdrawal sites. Therefore, the non-aqueous battery of the present invention can be advantageously used especially as a small, light-weight battery having a high capacity and excellent reliability and safety. For example, the non-aqueous battery of the present invention is very useful as a battery for portable equipments.

What is claimed is:

1. A non-aqueous battery of a thin configuration, comprising:
    (a) an electrochemical cell comprising a cathode, an anode and a non-aqueous electrolyte interposed between said cathode and said anode,
    (b) a hermetically sealed pouchy casing enveloping said electrochemical cell (a), and
    (c) at least a pair of terminals electrically connected to said cathode and said anode,
    said pouchy casing comprising opposing sheets of at least-three-layer laminates, each laminate comprising (1) an inner thermoplastic resin layer, (2) a middle metal foil layer and (3) an outer electrically insulating material layer, wherein said pouchy casing has an elongated, hermetic adhesion area along a periphery of the pouchy casing, in which adhesion area opposing inner thermoplastic resin layers (1) are melt-adhered to each other, thereby forming a hermetic seal of the pouchy casing, wherein said middle metal foil layer (2) has a peripheral elongated region in said elongated, hermetic adhesion area of the pouchy casing,
    said terminals extending through and protruding from terminal-withdrawal sites in said elongated, hermetic adhesion area toward the outside of said pouchy casing,
    wherein said non-aqueous battery satisfies at least one of the following characteristics (i) and (ii):
    (i) said peripheral elongated region of said middle metal foil layer (2) has cut-out portions around said terminal-withdrawal sites in said elongated hermetic adhesion area of said pouchy casing through which said terminals extend, wherein each of said cut-out portions in said peripheral elongated region of said middle metal foil layer in said elongated, hermetic adhesion area has a predetermined width-wise depth as viewed and measured in a direction of the width of said peripheral elongated region of said middle metal foil layer from a peripheral edge of a pouchy casing, and wherein portions of said peripheral elongated region of said middle metal foil layer that are not cut out remain in the elongated hermetic adhesion area and the width of each of the remaining non-cut-out portions of said metal foil layer is at least ten times the thickness of said inner thermoplastic resin layer (1) in said elongated, hermetic adhesion area; and
    (ii) the surface of the peripheral edge of the pouchy casing comprised of said laminate is provided with electric insulation at least at portions thereof around said terminal-withdrawal sites.

2. The battery according to claim 1, wherein the width of said elongated, hermetic adhesion area is within the range of from 1 to 50 mm.

3. The battery according to claim 1, wherein the depth of each of the cut-out portions of the middle metal foil layer is 0.1 mm or more and not more than 80% of the width of said elongated, hermetic adhesion area.

4. The battery according to claim 3, wherein the depth of each of the cut-out portions of the middle metal foil layer is 0.5 mm or more and not more than 50% of the width of said elongated, hermetic adhesion area.

5. The battery according to claim 1, wherein the width of each of the cut-out portions of the middle metal foil layer is not less than one-half of the circumference of a cross-section of said terminal at the terminal-withdrawal site.

6. The battery according to claim 1, wherein the melting temperature of said outer electrically insulating material layer (3) is 260° C. or more.

7. The battery according to claim 1, wherein said outer electrically insulating material layer (3) has at least one modulus value selected from the group consisting of a tension modulus of 300 kg/mm$^2$ or more and a compression modulus of 50 kg/mm$^2$ or more.

8. The battery according to claim 1, wherein said laminate further comprises at least one intermediate electrically insulating material layer between said inner thermoplastic resin layer (1) and said middle metal foil layer (2).

9. The battery according to claim 8, wherein the melting temperature of said intermediate electrically insulating material layer disposed between said inner thermoplastic resin layer (1) and said middle metal foil layer (2) is 260° C. or more.

10. The battery according to claim 8, wherein said intermediate electrically insulating material layer disposed between said inner thermoplastic resin layer (1) and said middle metal foil layer (2) has at least one modulus value selected from the group consisting of a tension modulus of 300 kg/mm$^2$ or more and a compression modulus of 50 kg/mm$^2$ or more.

11. The battery according claim 1, wherein at least one layer selected from the group consisting of said thermoplastic resin layer and said electrically insulating material layer is made of a polyvinylidene chloride resin.

12. The battery according to claim 1, wherein said terminal is made of aluminum or copper.

13. The battery according to claim 12, wherein at least a part of the surface of said terminal is roughened.

14. The battery according to claim 1, which further comprises means adapted to be actuated to cut at least a part of the terminal when said pouchy casing suffers expansion and distortion.

15. The battery according claim 1, wherein said battery is a secondary lithium ion battery.

* * * * *